(12) United States Patent
Mazzagatti et al.

(10) Patent No.: US 7,676,330 B1
(45) Date of Patent: Mar. 9, 2010

(54) METHOD FOR PROCESSING A PARTICLE USING A SENSOR STRUCTURE

(75) Inventors: Jane Campbell Mazzagatti, Blue Bell, PA (US); Steven L. Rajcan, Glenmoore, PA (US)

(73) Assignee: Unisys Corporation, Blue Bell, PA (US)

( * ) Notice: Subject to any disclaimer, the term of this patent is extended or adjusted under 35 U.S.C. 154(b) by 967 days.

(21) Appl. No.: 11/436,969

(22) Filed: May 16, 2006

(51) Int. Cl.
*G01N 31/00* (2006.01)
(52) U.S. Cl. ....................................... 702/23
(58) Field of Classification Search ................ 702/23; 707/102
See application file for complete search history.

(56) References Cited

U.S. PATENT DOCUMENTS

| | | |
|---|---|---|
| 4,286,330 A | 8/1981 | Isaacson |
| 5,245,337 A | 9/1993 | Bugajski |
| 5,293,164 A | 3/1994 | Bugajski |
| 5,592,667 A | 1/1997 | Bugajski |
| 5,630,125 A | 5/1997 | Zellweger |
| 5,634,133 A | 5/1997 | Kelley |
| 5,829,004 A | 10/1998 | Au |
| 5,894,311 A | 4/1999 | Jackson |
| 5,918,229 A | 6/1999 | Davis et al. |
| 5,930,805 A | 7/1999 | Marquis |
| 5,963,965 A | 10/1999 | Vogel |
| 5,966,709 A | 10/1999 | Zhang |
| 5,970,490 A | 10/1999 | Morgenstern |
| 5,978,794 A | 11/1999 | Agrawal et al. |
| 5,983,232 A | 11/1999 | Zhang |
| 6,018,734 A | 1/2000 | Zhang |
| 6,029,170 A | 2/2000 | Garger |
| 6,031,993 A | 2/2000 | Andrews et al. |
| 6,102,958 A | 8/2000 | Meystel |
| 6,115,715 A | 9/2000 | Traversat et al. |
| 6,138,115 A | 10/2000 | Agrawal et al. |
| 6,138,117 A | 10/2000 | Bayardo |
| 6,144,962 A | 11/2000 | Weinberg et al. |
| 6,160,549 A | 12/2000 | Touma et al. |

(Continued)

FOREIGN PATENT DOCUMENTS

EP                0 079 465            1/1985

(Continued)

OTHER PUBLICATIONS

Gschia-Yuan Teng & David L. Neuhoff, "An Improved Hierarchical Lossless Text Compression Algrithm", Proceedings 1995 Data Compression Conference.

(Continued)

*Primary Examiner*—Tung S Lau
*Assistant Examiner*—Xiuquin Sun
(74) *Attorney, Agent, or Firm*—Robert P. Marley; Richard J. Gregson

(57) ABSTRACT

A method for processing KStore sensors for use by a KEngine in a KStore system to process a K includes providing a stream of particles, instantiating a KStore sensor structure, identifying particles to be included in a sensor set and processing said identified particles. The KStore sensor structure can provide a correspondence between a particle and a sensor K node. Furthermore, the KStore sensor structure can be a list of K nodes, an indexed array or a hash table.

16 Claims, 21 Drawing Sheets

U.S. PATENT DOCUMENTS

| | | | |
|---|---|---|---|
| 6,233,575 B1 | 5/2001 | Agrawal et al. |
| 6,275,817 B1 | 8/2001 | Reed et al. |
| 6,278,987 B1 | 8/2001 | Reed et al. |
| 6,286,002 B1 | 9/2001 | Axaopoulos et al. |
| 6,341,281 B1 | 1/2002 | MacNicol et al. |
| 6,356,902 B1 | 3/2002 | Tan et al. |
| 6,360,224 B1 | 3/2002 | Chickering |
| 6,373,484 B1 | 4/2002 | Orell et al. |
| 6,381,600 B1 | 4/2002 | Lau |
| 6,389,406 B1 | 5/2002 | Reed et al. |
| 6,394,263 B1 | 5/2002 | McCrory |
| 6,453,314 B1 | 9/2002 | Chan et al. |
| 6,470,277 B1 | 10/2002 | Chin et al. |
| 6,470,344 B1 | 10/2002 | Kothuri et al. |
| 6,473,757 B1 | 10/2002 | Garofalakis et al. |
| 6,477,683 B1 | 11/2002 | Killian et al. |
| 6,499,026 B1 | 12/2002 | Rivette et al. |
| 6,505,184 B1 | 1/2003 | Reed et al. |
| 6,505,205 B1 | 1/2003 | Kothuri et al. |
| 6,581,063 B1 | 6/2003 | Kirkman |
| 6,591,272 B1 | 7/2003 | Williams |
| 6,604,114 B1 | 8/2003 | Toong et al. |
| 6,615,202 B1 | 9/2003 | Ding et al. |
| 6,624,762 B1 | 9/2003 | End, III |
| 6,635,089 B1 | 10/2003 | Burkett et al. |
| 6,662,185 B1 | 12/2003 | Stark et al. |
| 6,681,225 B1 | 1/2004 | Uceda-Sosa et al. |
| 6,684,207 B1 | 1/2004 | Greenfield et al. |
| 6,691,109 B2 | 2/2004 | Bjornson et al. |
| 6,704,729 B1 | 3/2004 | Klein et al. |
| 6,711,585 B1 | 3/2004 | Copperman et al. |
| 6,745,194 B2 | 6/2004 | Burrows |
| 6,748,378 B1 | 6/2004 | Lavender et al. |
| 6,751,622 B1 | 6/2004 | Puri et al. |
| 6,760,720 B1 | 7/2004 | De Bellis |
| 6,768,995 B2 | 7/2004 | Thier et al. |
| 6,769,124 B1 | 7/2004 | Schoening et al. |
| 6,799,184 B2 | 9/2004 | Bhatt et al. |
| 6,804,688 B2 | 10/2004 | Kobayashi et al. |
| 6,807,541 B2 | 10/2004 | Bender et al. |
| 6,816,856 B2 | 11/2004 | Baskins et al. |
| 6,826,556 B1 | 11/2004 | Miller et al. |
| 6,831,668 B2 | 12/2004 | Cras et al. |
| 6,868,414 B2 | 3/2005 | Khanna et al. |
| 6,900,807 B1 | 5/2005 | Liongosari et al. |
| 6,920,608 B1 | 7/2005 | Davis |
| 6,931,401 B2 | 8/2005 | Gibson et al. |
| 6,952,736 B1 | 10/2005 | Westbrook |
| 6,965,892 B1 | 11/2005 | Uceda-Sosa et al. |
| 7,027,052 B1 | 4/2006 | Thorn et al. |
| 7,130,859 B2 | 10/2006 | Kobayashi | 707/102 |
| 7,228,296 B2 | 6/2007 | Matsude |
| 2001/0010048 A1 | 7/2001 | Kobayashi | 707/2 |
| 2002/0124003 A1 | 9/2002 | Rajasekaran et al. |
| 2002/0138353 A1 | 9/2002 | Schreiber et al. |
| 2002/0143735 A1 | 10/2002 | Ayi et al. |
| 2002/0143783 A1 | 10/2002 | Bakalash et al. |
| 2002/0188613 A1 | 12/2002 | Chakraborty et al. |
| 2002/0194173 A1 | 12/2002 | Bjornson et al. |
| 2003/0009443 A1 | 1/2003 | Yatviskly |
| 2003/0033279 A1 | 2/2003 | Gibson et al. |
| 2003/0093424 A1 | 5/2003 | Chun et al. |
| 2003/0115176 A1 | 6/2003 | Bobroff et al. |
| 2003/0120651 A1 | 6/2003 | Bernstein |
| 2003/0204513 A1 | 10/2003 | Bumbulis |
| 2003/0204515 A1 | 10/2003 | Shadmon et al. |
| 2003/0217335 A1 | 11/2003 | Chung et al. |
| 2004/0107186 A1 | 6/2004 | Najork et al. |
| 2004/0133590 A1 | 7/2004 | Henderson et al. |
| 2004/0143571 A1 | 7/2004 | Bjornson et al. |
| 2004/0169654 A1 | 9/2004 | Walker et al. |
| 2004/0230560 A1 | 11/2004 | Elza et al. |
| 2004/0249781 A1 | 12/2004 | Anderson |
| 2005/0015383 A1 | 1/2005 | Harjanto |
| 2005/0050054 A1 | 3/2005 | Clark et al. |
| 2005/0060325 A1 | 3/2005 | Bakalash et al. |
| 2005/0071370 A1 | 3/2005 | Altschul et al. |
| 2005/0080800 A1 | 4/2005 | Parupudi et al. |
| 2005/0097108 A1 | 5/2005 | Wang et al. |
| 2005/0102294 A1 | 5/2005 | Coldewey |
| 2005/0149503 A1 | 7/2005 | Raghavachari |
| 2005/0171960 A1 | 8/2005 | Lomet |
| 2005/0179684 A1 | 8/2005 | Wallace |
| 2005/0198042 A1 | 9/2005 | Davis |
| 2005/0262108 A1 | 11/2005 | Gupta |
| 2007/0233723 A1* | 10/2007 | Mazzagatti | 707/102 |

FOREIGN PATENT DOCUMENTS

| | | |
|---|---|---|
| WO | WO 95/17783 | 6/1995 |
| WO | WO 99/34307 | 7/1999 |
| WO | WO 01/46834 | 6/2001 |
| WO | WO 02/063498 | 8/2002 |

OTHER PUBLICATIONS

Won Kim & Myung Kim, "Performance and Scaleability in Knowledge Engineering: Issues and Solutions", Journal of Object-Oriented Programming, vol. 12, No. 7, pp. 39-43, Nov./Dec. 1999.

Jeffrey O. Kephart & David M. Chess, "The Vision of Autonomic Computing", T.J. Watson Research Jan. 2003.

Linda Dailey Paulson, "Computer System, Heal Thyself", Aug. 2003.

Dave Gussow, "Headline: IBM-Enterprise Storage Server Shines at Colgate Palmolive", Jan. 6, 2003.

Caroline Humer, "IBM Creates Self-Healing Computer Unit", Jan. 8, 2003.

Burton F. W. et al:"Multiple Generation Text Files Using Overlaping Tree Structures", Computer Journal, Oxford University Press, Surrey, GB. vol. 28, No. 4 Aug. 1985, pp. 414-416.

* cited by examiner

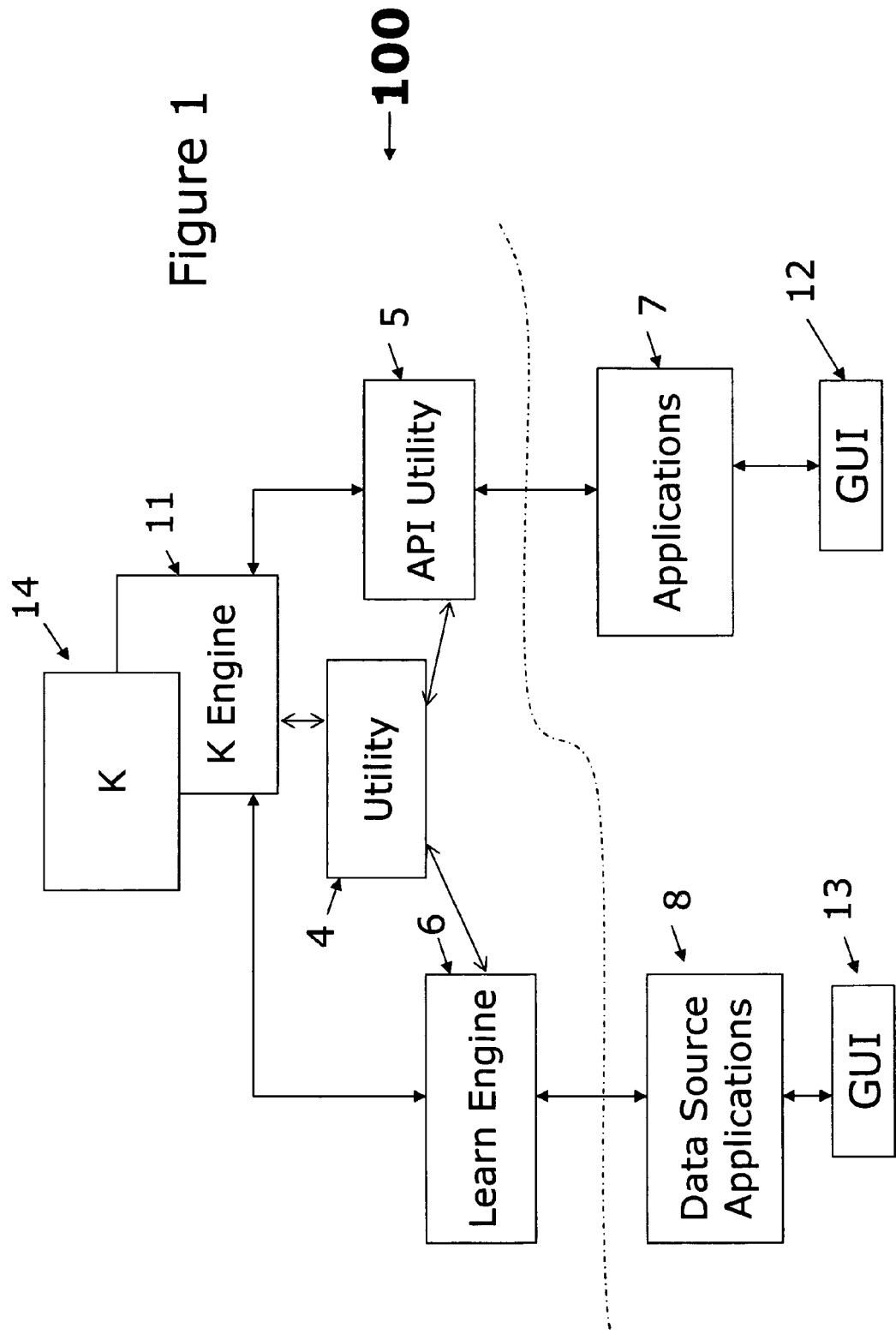

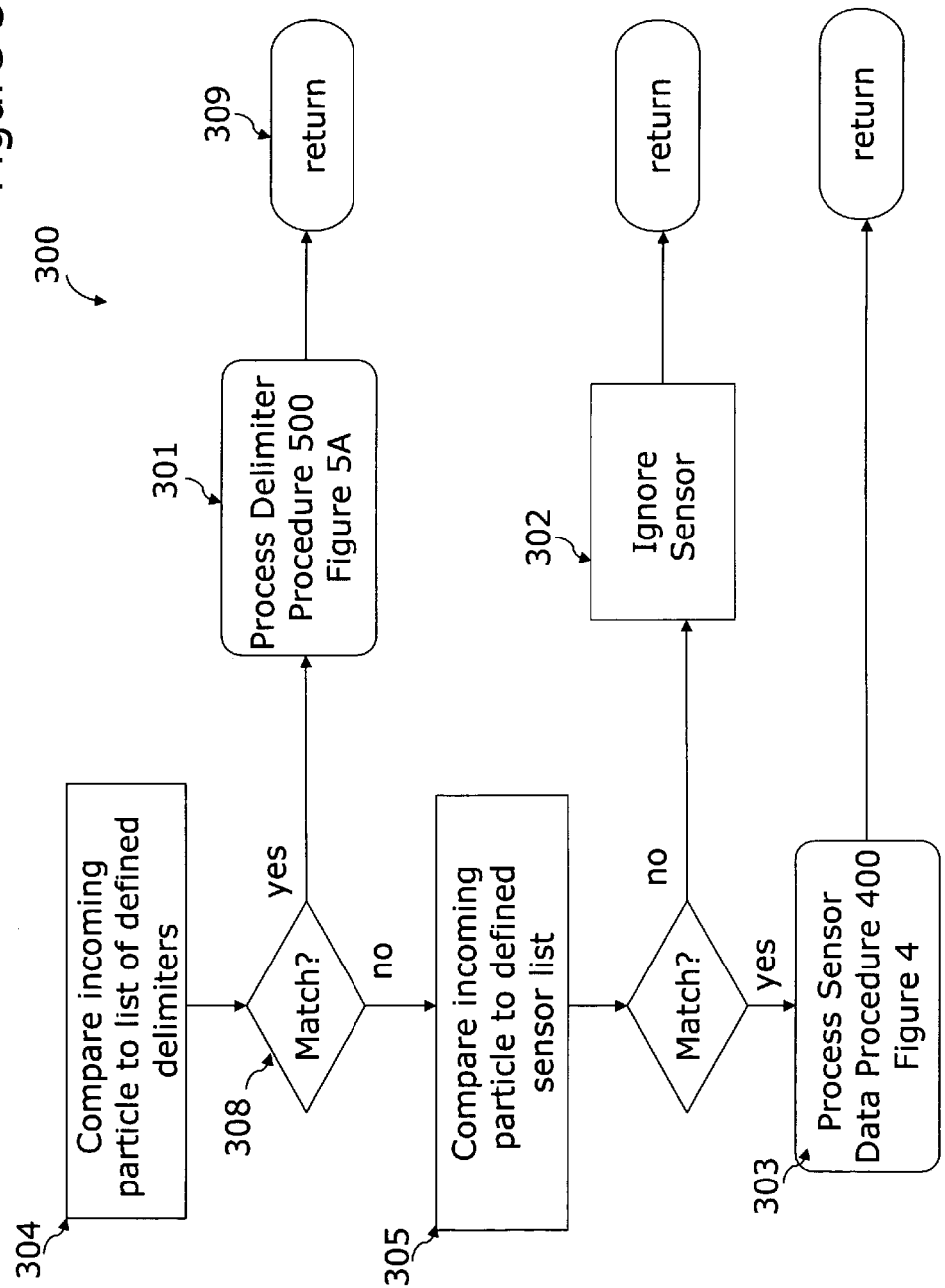

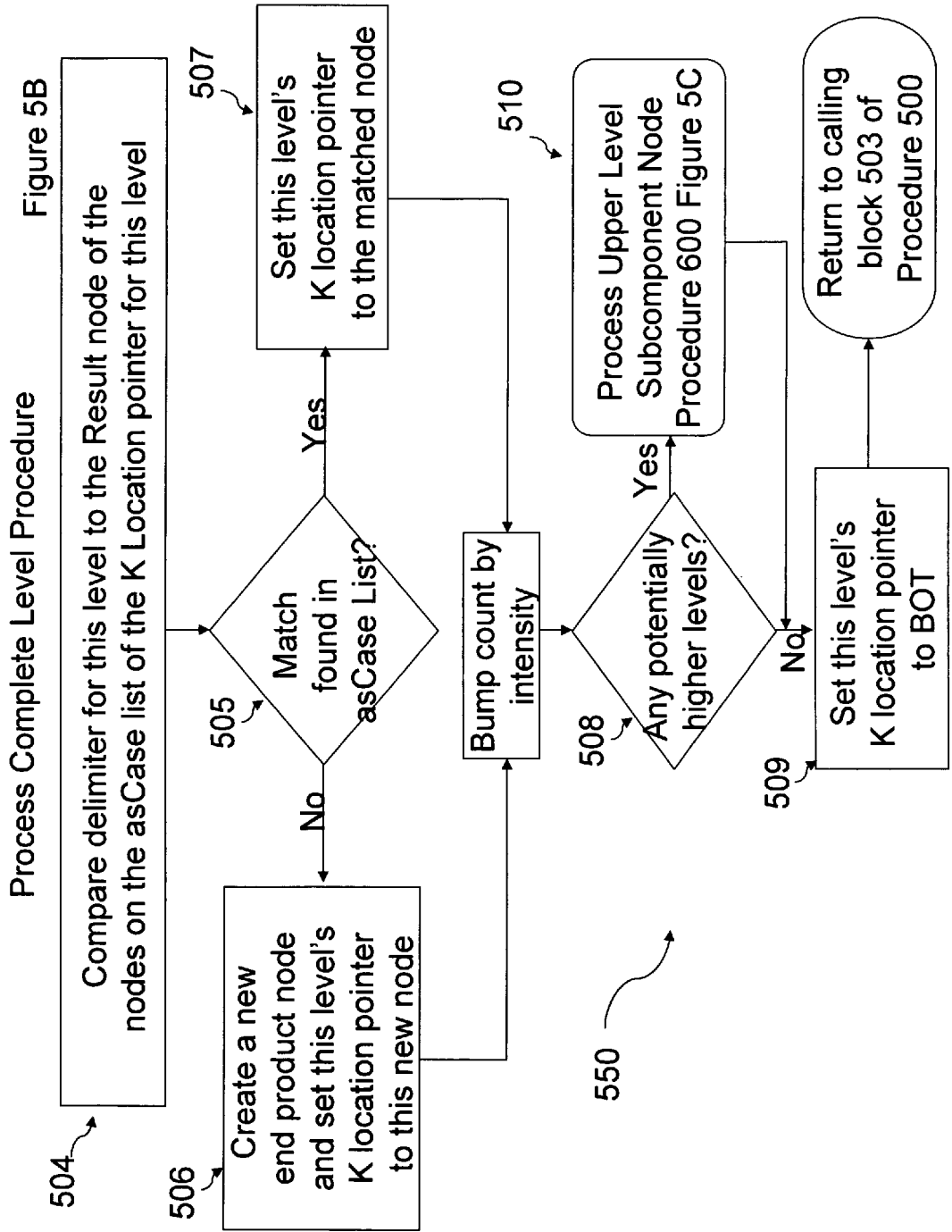

Figure 8

Original Sample Data Set – Sales Activities

Bill Tuesday sold PA
Bill Monday sold NJ
Bill Monday trial PA
Bill Monday trial PA
Bill Monday trial PA

800

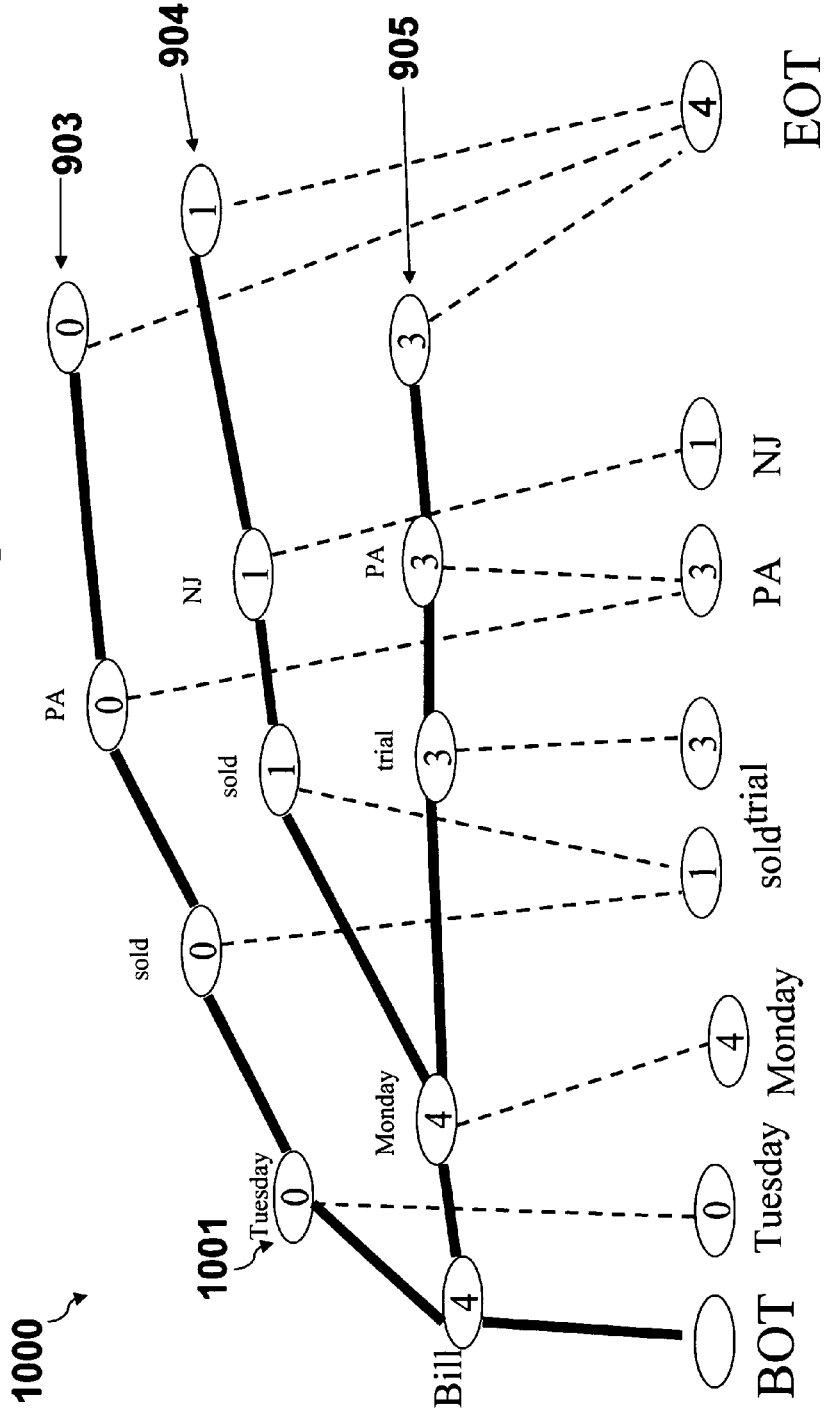

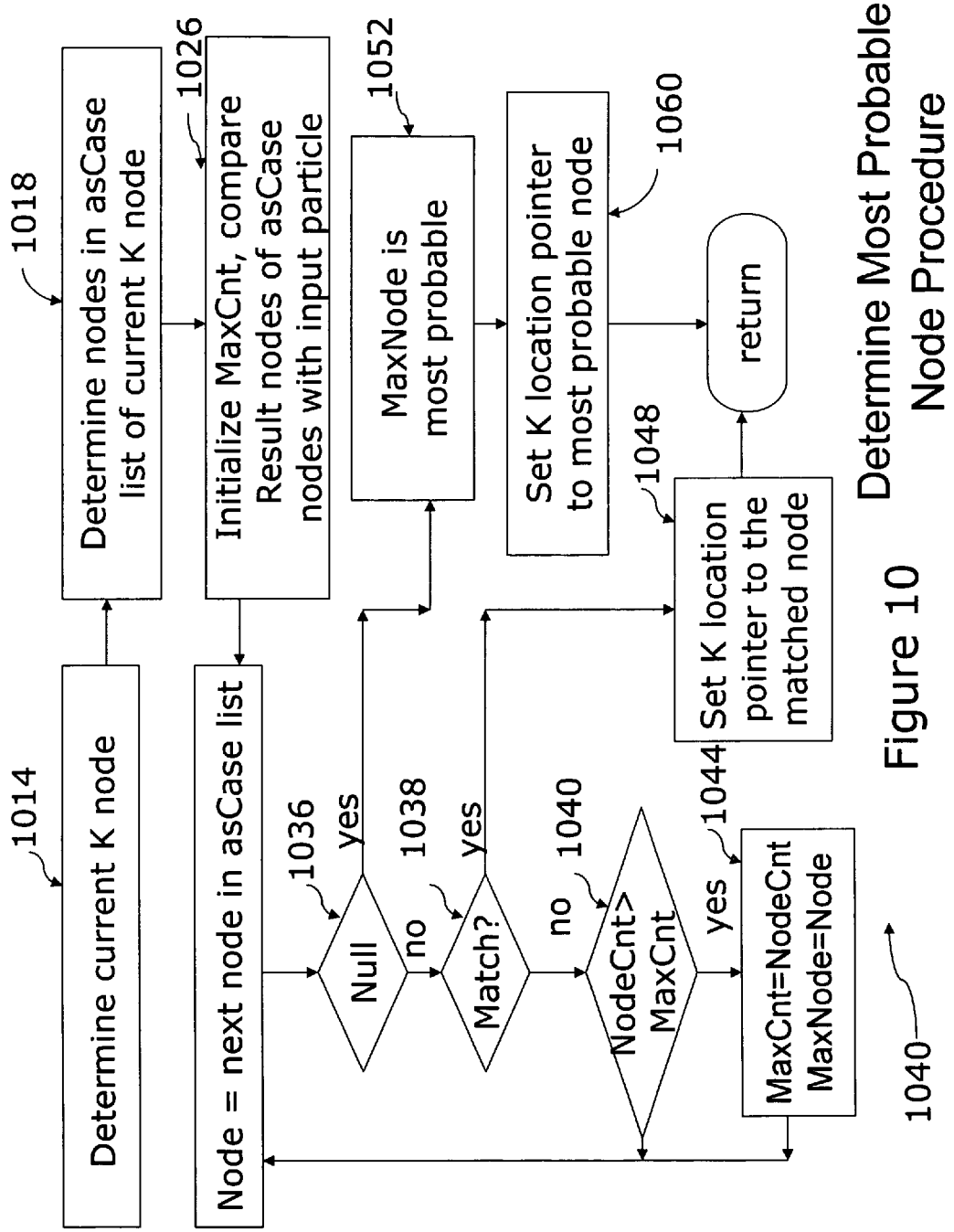
Figure 10   Determine Most Probable Node Procedure

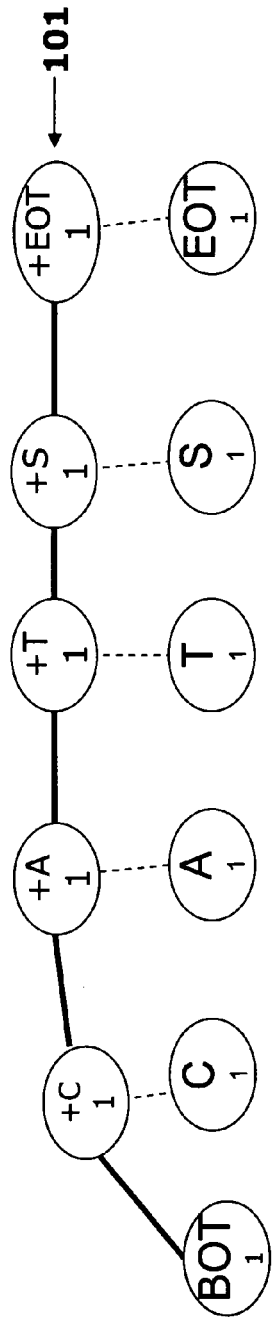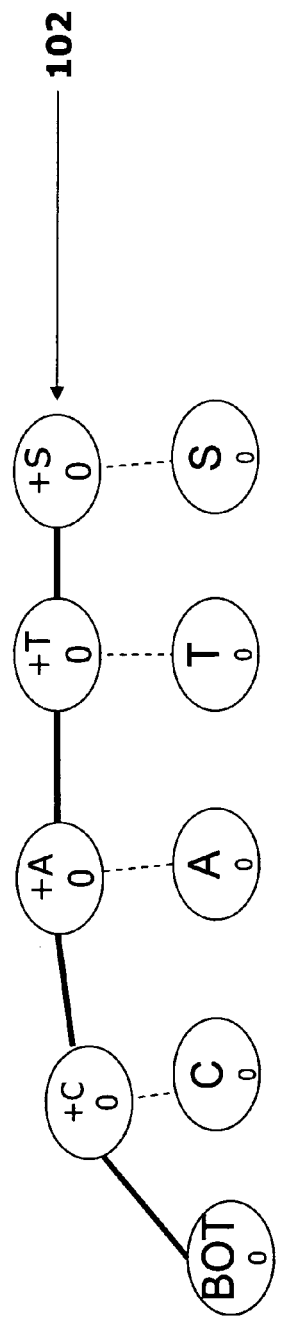
Figure 11A
Figure 11B

Process Update Count Procedure

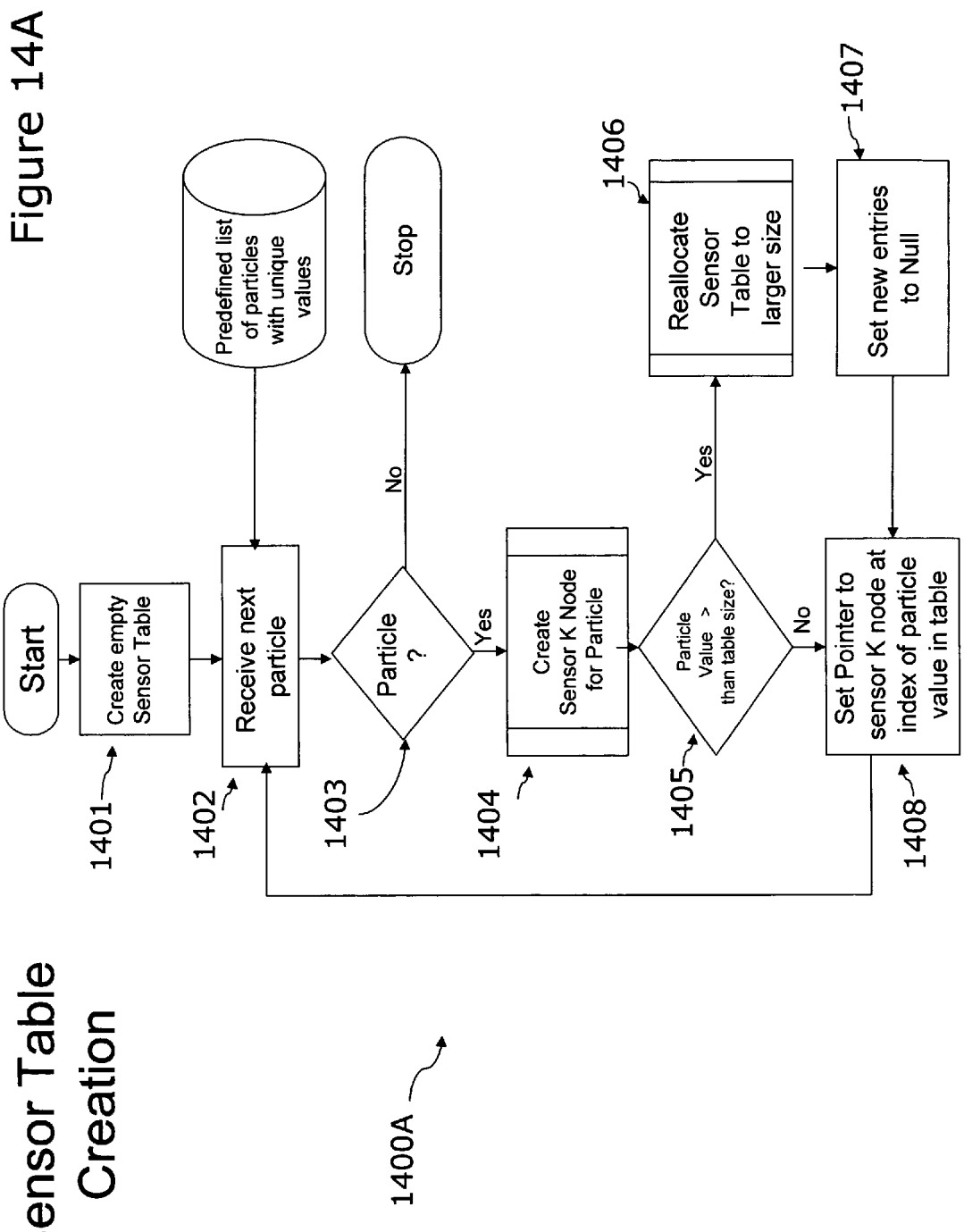

Sensor Table Lookup

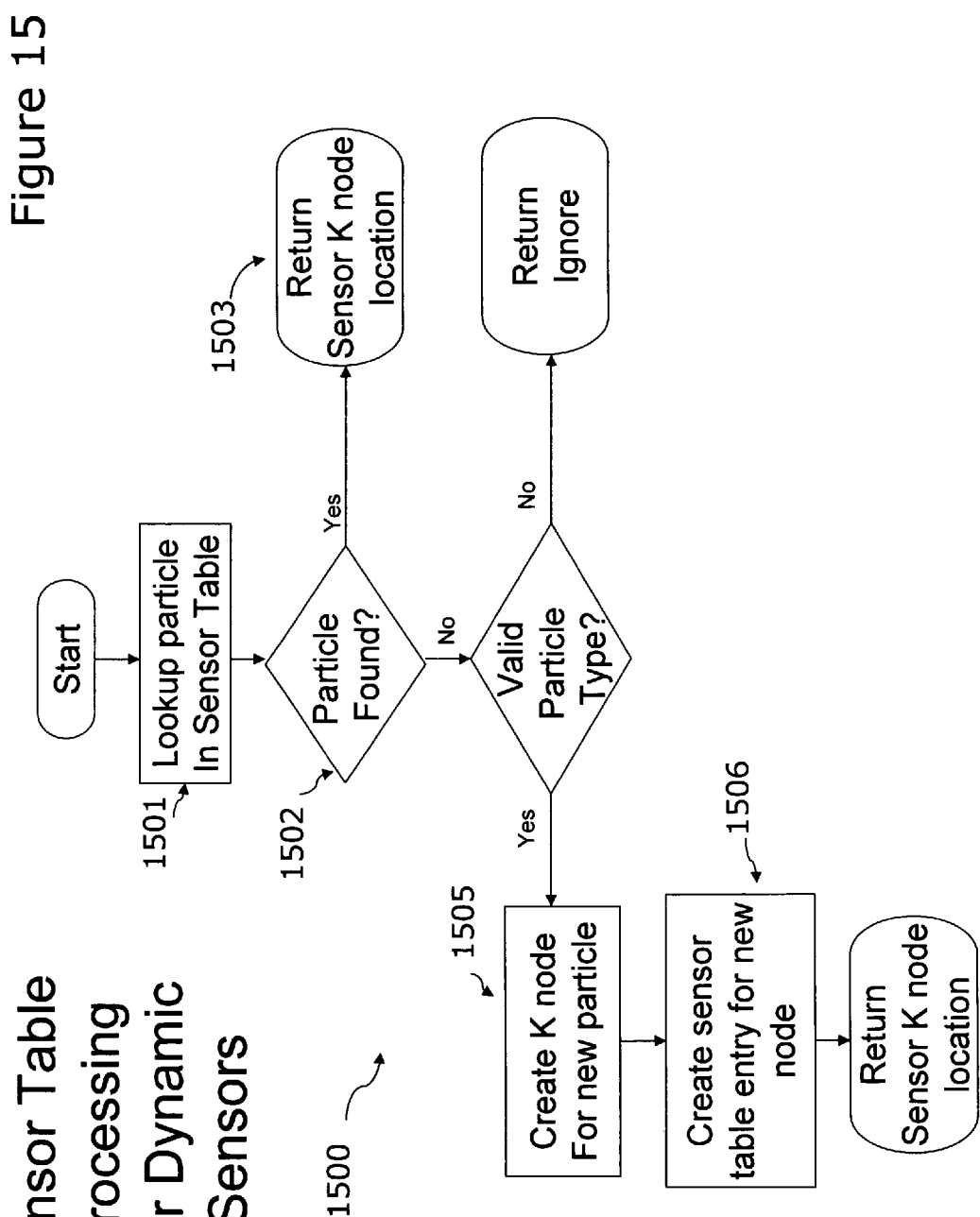

METHOD FOR PROCESSING A PARTICLE USING A SENSOR STRUCTURE

FIELD OF INVENTION

This invention relates to computing and, in particular to the field of database storage technology and the field of interlocking trees datastores.

DESCRIPTION OF RELATED ART

While interlocking trees datastores are covered in other patents by inventor Mazzagatti, it may be useful to provide a brief background summary of KStore and various features of said interlocking trees datastores.

A system and various methods for creating and using interlocking trees datastores and various features of the interlocking trees datastores have been developed. We refer to an instantiation of these interlocking trees datastores that we have developed as a KStore or just K. In particular, these structures and methods have been described in U.S. Pat. No. 6,961,733 and copending patent application Ser. No. 10/666, 382, (now published as 20050076011A1) by inventor Mazzagatti. Additionally, we described a system in which such interlocking trees datastores could more effectively be used in U.S. Ser. No. 11/185,620, entitled "Method for Processing New Sequences Being Recorded into an Interlocking Trees Datastore." This invention provides the process invented to build and access the structure.

In U.S. Pat. No. 6,961,733 and U.S. Ser. No. 10/666,382, (now published as 50050076011), also by inventor Mazzagatti, we explained some preferred methods used to build and access an interlocking trees datastore. The methods taught in both of these patents were written at a level that taught the methodology of how an interlocking trees datastore is built and accessed.

While interlocking trees datastores are covered in other patents by inventor Mazzagatti, it may be useful to provide a brief background summary of KStore and various features of said interlocking trees datastores.

A system and various methods for creating and using interlocking trees datastores and various features of the interlocking trees datastores have been developed. We refer to an instantiation of these interlocking trees datastores that we have developed as a KStore or just K. In particular, these structures and methods have been described in U.S. Pat. No. 6,961,733 and copending patent application Ser. No. 10/666, 382, (now published as 20050076011A1) by inventor Mazzagatti. Additionally, we described a system in which such interlocking trees datastores could more effectively be used in U.S. Ser. No. 11/185,620, entitled "Method for Processing New Sequences Being Recorded into an Interlocking Trees Datastore." This invention provides the process invented to build and access the structure.

In U.S. Pat. No. 6,961,733 and U.S. Ser. No. 10/666,382, (now published as 50050076011), also by inventor Mazzagatti, we explained some preferred methods used to build and access an interlocking trees datastore. The methods taught in both of these patents were written at a level that taught the methodology of how an interlocking trees datastore is built and accessed.

All references cited herein are incorporated herein by reference in their entireties.

SUMMARY

A method for processing KStore sensors for use by a KEngine in a KStore system to process a K includes providing a stream of particles, instantiating a KStore sensor structure, identifying a particle to be included in a sensor set and processing the identified particle. The KStore sensor structure may provide a correspondence between a particle and a sensor K node. Furthermore, the KStore sensor structure may be a list of K nodes, an indexed array or a hash table.

Access to a K for querying and recording information, may be achieved through a KEngine. The information or data may be particlized and the particles may be sent to the KEngine for processing. The KEngine process may begin by matching the particles to a set of K sensors. In order to determine if a particle corresponds to a sensor K node, in one embodiment, the K Engine may search a list of sensor K node pointers. The value associated with each sensor K node may then be compared with the value of the particle in order to find the sensor K node associated with the particle. The search may end when a match is found or all sensor K nodes have been searched.

Another embodiment of the present invention provides a more efficient method for determining a sensor K node. It is generally possible to associate a unique numeric value with each particle value, and then use this unique numeric value as an index into an array of sensor K node pointers, i.e. into a sensor index table. As a result, the sensor index table is not searched, it is directly referenced. The entries in the sensor index table contain pointers to the elementary root node or sensor K node associated with each recognized data particle.

In preferred embodiments, the sensor index table may be created at instantiation of the K or at the beginning of a learn process and used to store pointers to the sensor K nodes for each predefined particle of data that is to be recognized by the Praxis procedure.

When a particle is processed, the first thing that may be determined is the particle type. Instead of searching through a list of all sensor K nodes looking for a match, a unique numerical index, which corresponds to the value of an individual particle, may be used to index into a sensor index table.

If the index is associated with a pointer, then a sensor K node corresponding to the particle exists. The pointer may be used to locate the corresponding sensor K node.

If the unique numerical value of the particle does not index to a location in the table containing a pointer, the individual data particle does not have a corresponding sensor K node. In some alternative embodiments the particle may then be ignored. In another alternative solution, a new sensor K node may be created and the pointer to the new sensor K node may be entered into the sensor index table.

The indexing method for determining a sensor K node is a method whereby a unique numerical value associated with a particle is used as an index into an array of pointers to sensor K nodes.

As sequences are learned into a K, the K may be queried by multiple applications at the same time. Therefore queries may encounter partially recorded events. Some of the partially recorded events may be determined during the learn process to be in error. When this occurs, the partial event may need to be backed out of the K structure. If a history of errors is maintained by leaving error nodes within the structure, the partial event may be kept indefinitely. A means should therefore be provided for identifying and ignoring the partial events during a query.

One method for preventing queries from attempting to process partial events is locking the entire structure during a learn operation until the recording of the entire sequence is completed. In this manner queries may only be performed when the entire K structure is in a complete state. This method can be inefficient.

Another method for preventing processing of partial events is permitting active queries to ignore partially recorded events. One way this can be accomplished is by adding a field to each node to indicate whether the node is part of a partial event or part of a complete event. The internal K utilities, the API utilities, the learn engine or other procedures can access the additional field to determine if a specific node should be ignored.

In many instantiations of a K, a count field is added to each K node. The count field may contain a value for indicating the number of times an event has been recorded. The count field may also be used to determine if the node is part of a completed sequence.

In one embodiment of the invention, the count field of a K node might be updated during a learn process at the time the nodes are either created or traversed. However, the count fields for the K nodes need not be incremented at the time as they are traversed or created. Instead, the count fields may be incremented as a set after a path is complete. In this way, the count fields for existing nodes may remain unchanged and the count for the nodes of any new structure may remain at 0 until the entire event is completed. This permits a partial path to be distinguished from a complete path.

The internal K utilities and API utilities of a K Store system may thus access the count fields during query processing and ignore any nodes with a zero count. In this method, existing nodes would correctly identify the number of complete paths that are recorded thereby maintaining the accuracy of any analytic calculations.

A method for updating the additional fields to indicate a complete path may include traversing the path. The traversal may be performed in any manner known to those skilled in the art. One preferred embodiment includes traversing the path from the end product node to the BOT node and then traversing back through the nodes updating the count fields associated with the nodes as the nodes are traversed back to the end product node.

In order to trigger the updating of additional nodes other additional fields may also be used to indicate a complete structure. The K engine can therefore access the additional fields to identify when a path has been completed. In one embodiment, the K engine may initiate the traversal when a specific end product node or delimiter is encountered. In another embodiment the traversal may be initiated by a praxis procedure which is adapted to determine whether an input particle is sensor data, a delimiter or unknown, and call routines for processing the particle accordingly. In a further embodiment the calling procedure may recognize that the last particle processed is an end product node and call a procedure to traverse and update the additional field. The calling procedure may provide some performance benefits by combining updates for duplicate paths.

While the K Engine is traversing and creating the K structure, a record of how many times each K path has been traversed may be needed for calculating the potential of events. A count field may be added to each K node to contain a value that can be updated according to the processes traversing the K. In one implementation a parameter attached to the K Engine call indicates whether or not the count incremented. Typically, the count is incremented for learning functions and not incremented for query functions.

An example of this in a field/record universe is that as transaction records are recorded into the K, the count field for each K node traversed could be incremented by 1. Newly created K nodes could be initialized to 1. As queries about the transaction records are processed the count fields can remain unchanged.

The increment value however is not always 1. In a field/record universe the increment may be any value. For example, if the transaction records being recorded in the K are sorted so that all duplicate records are together, the learn routine can send the duplicate record only once with a larger intensity value to be used to increment or initialize the K node count fields. Furthermore, the intensity value need not always be positive. Records or paths may be deleted from the K by subtracting an intensity value.

While the K Engine is traversing and creating the K structure, a record of how many times each K path has been traversed may be needed for calculating the potential of events. A count field may be added to each K node to contain a value that can be updated according to the processes traversing the K. In one implementation a parameter attached to the K Engine call indicates whether or not the count incremented. Typically, the count is incremented for learning functions and not incremented for query functions.

An example of this in a field/record universe is that as transaction records are recorded into the K, the count field for each K node traversed could be incremented by 1. Newly created K nodes could be initialized to 1. As queries about the transaction records are processed the count fields can remain unchanged.

The increment value however is not always 1. In a field/record universe the increment may be any value. For example, if the transaction records being recorded in the K are sorted so that all duplicate records are together, the learn routine can send the duplicate record only once with a larger intensity value to be used to increment or initialize the K node count fields. Furthermore, the intensity value need not always be positive. Records or paths may be deleted from the K by subtracting an intensity value.

A method for completing an incomplete sequence, or thought, in a KStore having a particle stream, the particle stream having a plurality of input particles including at least one delimiter includes receiving the at least one delimiter within the particle stream to provide a received delimiter and first determining a current K node in accordance with the received delimiter. A match is second determined in accordance with the received delimiter and the current K node to provide a match determination. The KStore is provided with a list of defined delimiters and the second determining includes accessing the list of defined delimiters. A determination is made whether the input particle is on the list of defined delimiters. The current K node has an adjacent K node that is adjacent to the current K node and the second determining includes locating the adjacent node in accordance with an asCase list of the current K node to provide a located asCase node. The asCase list includes a plurality of asCase nodes and a plurality of adjacent nodes is located in accordance with the asCase list. If the learn functionality of the KStore is disabled, no further operations may be performed in accordance with the received delimiter if no adjacent node of the plurality of adjacent nodes has a Result node that matches the input delimiter. If the learn functionality of is the KStore is enabled, Result node of the located asCase node is determined to provide a determined Result node, the second determining may include comparing the determined Result node with the received delimiter and a new node may be created.

The process used to create and access a K structure herein utilizes a procedure, which is called the praxis procedure. The praxis procedure may receive individual particles of incoming data, determine the type of particle and, based on the sensors and delimiters, access and construct the multiple levels of an interlocking trees datastore.

The KEngine creates and accesses a K structure from a stream of particles. Some of the particles in the particle stream may be identified as delimiters. Delimiters may be indicators that a portion of the particle stream is a complete sequence, or thought. As an example, a white space between characters in printed text indicates that one word is ending and another is beginning. The KEngine is required to recognize the delimiters and create K structure to record the represented data. Furthermore, the KEngine is designed to recognize and process particles as either delimiters or sensors. If a particle cannot be identified as either a delimiter or a sensor it may be ignored as noise.

Sensor particles are processed by the KEngine as extensions of a current sequence of events. If there is structure that has previously recorded the sequence, the K may be traversed to reposition the current K location pointer. If there is no previous structure recording the sequence, new K structure may be created to record the event.

While the KEngine is processing the particle stream some particles are recognized as ending a sequence and beginning a new sequence. For example, within the field record universe the particle stream is divided into fields and groups of fields are divided into records. A common method of identifying the end of one field and the beginning of the next is to insert a particle, such as a comma, into the stream to indicate the limits of the field and a different character, such as a semicolon, to indicate the limits of a record.

When the KEngine recognizes a comma particle, an EOT node may be appended to the current K path being created at a first level above the sensors, thereby completing a field entry. A new path beginning with the BOT node may then be established as the current K path for a further field entry. Particle processing then continues.

When the KEngine recognizes a semicolon particle, an EOT node may be appended to the current K path being created at the level above the field variable level. This may complete a record entry. A new K path beginning with the BOT node may be established as the current path for a record entry. In addition, the K path at the field variable below the record level may be completed and particle processing continues.

BRIEF DESCRIPTION OF SEVERAL VIEWS OF THE DRAWINGS

The invention will be described in conjunction with the following drawings in which like reference numerals designate like elements and wherein:

FIG. 1 shows a block diagram representation of the main components which may be used with the present invention.

FIG. 3 is a flowchart representation of a praxis procedure, which is a process that may match incoming particles of data with lists of delimiters, sensory data, and unidentified particles.

FIG. 5B is a flowchart representation of a procedure for processing a delimiter indicating a complete level of a K structure.

FIG. 8 is a table of records for sales activities from a fictional organization useful for heuristic purposes.

FIG. 9B is a possible KStore node diagram depicting the deletion of a sequence from the K Store of FIG. 9 when some of the counters are decremented to 0 and are maintained within the structure to provide a history.

FIG. 10 is a flowchart representation of a procedure for determining the most probable next node from a current node.

FIGS. 11A and 11B are graphical representations of a portion of an interlocking tree datastore used to illustrate how a K Engine may update a count field according to one embodiment of the invention.

FIG. 14A is a flowchart of a process for creating a sensor index table.

FIG. 15 is a flowchart of a process for handling previously undefined sensors.

DETAILED DESCRIPTION OF THE INVENTION

Figure 2A:
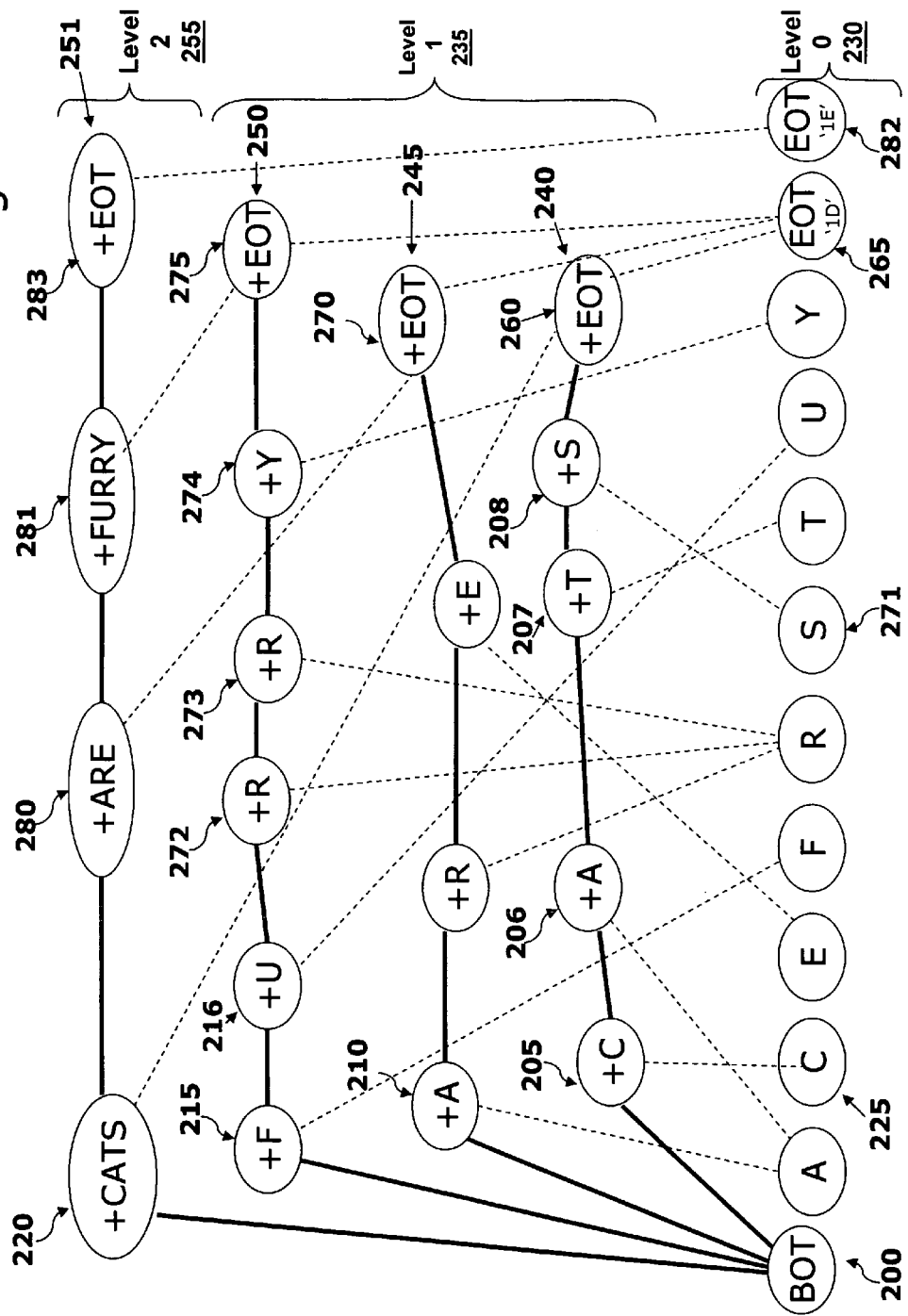
FIG. 2A is a graphical representation of an interlocking trees datastore showing a structure representing the words CATS ARE FURRY.

Referring now to FIG. 1, there is shown a block diagram representation 100 of a KStore environment in which the system and method of the present invention may be implemented. Within such a KStore environment, information may flow bi-directionally between the KStore 14 and the remainder of the system through the K Engine 11. The transmission of information to the K Engine 11 may be by way of a learn engine 6 and the data source 8. The transmission of information may be by way of an API utility 5 and the application 7 as also understood by those skilled in the art. Providing graphical user interfaces 13, 12 to data source 8 and the application 7 may thus permit an interactive user to communicate with the system.

The KEngine

The K Engine 11 receives a particle from somewhere outside the K engine 11 and creates or accesses the K structure 14. The K structure 14 contains elemental nodes that represent recognized particles of data. FIG. 2A is a graphical representation of an interlocking trees datastore having the K structure for representing CATS ARE FURRY. The graphical representation of FIG. 2A is used throughout this patent as an exemplary K structure for illustrative purposes.

Also represented within the K structure are the relationships that exist between the nodes. Each node in the K structure that is constructed may be assigned an address in memory. Additionally, each node may contain two pointers, a Case pointer and a Result pointer. The case pointer and the Result pointer of a node point to the two nodes from which it is formed. Also contained in a K node may be pointers to two pointer arrays, the asCase and the asResult array. The asCase array may contain pointers to the nodes whose Case pointers point to the K node. The asResult array, which contains pointers to the nodes whose Result pointers point to the K node. How the individual K nodes within a structure are constructed and accessed is the subject of numerous references by Mazzagatti, including U.S. Pat. No. 6,961,733.

Data Particles

As mentioned above, data passed from the learn engine 6, the utilities 4 or the API utilities 5 to the K Engine 11 are particlized. For example, each word in a sentence may be treated as an individual particle of data, or each letter in a word may be treated as an individual particle of data. For example, in a textual data stream containing the words CATS ARE FURRY, the individual word CATS may be a particle, which may be sensed by a word particle sensor. Additionally, the word ARE and the word FURRY are particles which may be sensed by word particle sensors.

Each character or letter in a word, such as CAT, may be considered to be a particle which may be sensed by a sensor, in this case a character particle sensor (i.e., C is a particle of CAT as is A and T). Each of these may be a particle of data in a field/record textual universe of data. By textual it is meant that data are made up of alphanumeric characters (e.g. the letters A through Z), special characters (e.g. punctuation) and numeric data (e.g. numbers). The term field/record is a carry over from traditional database terminology, wherein a field represents the title of a column in a table and a record represents the rows within the table and contains the actual data.

However, textual data is not the only type of data that may be streamed by the learn engine 6, utility 4 or API utility 5 into the K Engine 11. Those skilled in the art will understand that any kind of data that may be digitized may be particlized and streamed into K. For example, if the data universe is image data, the particles that may be digitized may be pixels. If the data universe is auditory data, the particles may be digitized sound waves. If the data universe is pressure data, particles may be digitized pressure values. If the data universe is olfactory data, particles may be digitized chemical molecules representing odors.

In many of the explanations that follow, the examples use data from the field/record universe. This means that in the examples, it is assumed that the data which is learned or accessed within K may come from traditional tabular databases or other traditional data structures in the form of text, numbers and special characters arranged in fields within records. But, it should be remembered that any type of data from any source that may be digitized may be learned and accessed within a K and therefore could have been used in the examples that follow. Also, the K structure may contain more than two levels of structure. As well, in the following, a KStore node diagram, as shown in FIG. 2A, is used to illustrate an interlocking trees datastore depicting the creation of the words +CATS, +ARE and +FURRY and the sentence CATS ARE FURRY.

Generating an Interlocking Trees Datastore (K) from Particlized Data

As taught in U.S. Pat. No. 6,961,733 and illustrated in FIG. 1 herein, an exemplary system 100 for generating the interlocking trees datastore 14 in one embodiment may include the K Engine 11. The K Engine 11 may receive particles of data from a data stream from the learn engine 6, from the API utility 5 or from any other utility 4. The K Engine 11 is designed to recognize and process particles of data that it receives. Note that some of the particles may be created and used strictly within the K Engine 11. For example, BOT, end of list (EOL), end of record (EOR) or end of identity (EOI) may be elemental nodes. In the current embodiment there are three types of particles that the K Engine may recognize: sensors, delimiters, and unidentified particles.

Praxis Procedure

A procedure that may recognize particles of sensor data, delimiters or unidentified particles according to the system and method of the invention may be the praxis procedure. FIG. 3 shows a flowchart representation of a portion of the praxis procedure 300 which may be used for recognizing input particles in the system of the present invention. In the current embodiment, there may be three procedures corresponding to the three types of particles that may be received as input during the praxis procedure 300: (1) a procedure for processing a delimiter 301, (2) a procedure for processing unidentified particles (ignore sensor) 302 and (3) a procedure for processing sensor data 303. The following teaches the praxis procedure 300 in a preferred embodiment with special emphasis on how delimiters are processed and used to build and access an interlocking trees datastore consisting of multiple levels of K structure and how K location pointers or state are utilized.

Sensor Data, Delimiters, and Unidentified Particles

Before teaching in detail how sensor data, delimiters and unidentified particles are processed, it is necessary to explain what each of the three types of particles includes.

Sensor Data

A sensor may be any digitized data. A sensor is maintained within the K structure as an elemental root node. The elemental root nodes representing sensors may contain or point to values that match the digitized value of the sensor. In a field/record data universe, sensor data may include, but is not limited to, alphanumeric characters. The alphanumeric characters may include the letters in the alphabet, numbers and special characters such as punctuation and other special characters. Depending on how a system is configured a particle of sensor data may include only single letters, numbers, or characters, or they may be whole words, phrases, sentences, paragraphs, chapters, or even entire books, etc. Furthermore, particles may include pixel values forming images of single letters or images of any other type. Thus, as mentioned above, data particles are not limited to textual data and may consist of any other forms of digitized data (e.g. pixels forming other images, sound waves, etc.).

Delimiters

Delimiters are particles that are used to identify an ending of a set of sensors. Furthermore, delimiters may be used to group sensor sets into hierarchies. For instance in a field/record universe, sets of letters may be grouped into words by delimiters. The words may then be grouped into field names or field values by delimiters. The field names or field values may be further grouped into fields and then into records.

Delimiters may be equivalent to individual sensors or sets of sensors. Or they may contain different values altogether. In the current embodiment, delimiters may include alphanumeric characters such as the letters of the alphabet, special characters such as, but not limited to, commas (,), semicolons (;), periods (.), and blanks ( ). Numbers in any base systems may also be used as delimiters. For example, in the current embodiment hexadecimal (base 16) numbers may be used as delimiters. However, as mentioned above, because particles are not limited to characters in the textual field/record universe, delimiters may also be any different type of digitized particle. For example, in a universe of digitized pixels, a single pixel or group of pixels may be used as a delimiter.

Unidentified Particles

Unidentified particles are any particles other than the ones that a current set of particle sensors and delimiter sensors recognizes. Unidentified particles, often called noise, may be, for example, particles of data from a different data character set (e.g. an Arabic or Chinese character). They may be particles from a different data universe, or they may just be an unprintable character that is not in the current set of sensors or delimiters.

Determining Particle Types

Refer back to FIG. 3. As taught above, the praxis procedure 300 may determine the particle type of an incoming particle received by a K Engine within a K system such as the K system 100. Based on the type of particle determined, the praxis procedure 300 may initiate one of three processes to process delimiters, sensor data or unidentified particles.

Comparing Particles to Delimiter List

In the praxis procedure 300 a particle of incoming data may be compared to a currently defined list of delimiters as shown in block 304. If the input particle matches an entry in the currently defined list of delimiters a process delimiter procedure is performed as shown in block 301. A process delimiter procedure that may be performed when a particle is determined to be a delimiter according to block 301 is taught below as the process delimiter procedure 500 in FIG. 5A.

Comparing Particles to Sensor List

If the input particle does not match any of the current delimiters as determined according to the comparison of block 304 the praxis procedure 300 may continue to block 305. At block 305 the praxis procedure 300 may compare the incoming particle to a currently defined list of sensors.

The example in the following discussion uses the letter C as an exemplary particle of data from a textual field/record universe. Assume that in the example the letter C does not match any delimiter in the current set of delimiters and execution of the praxis procedure 300 proceeds to block 305. The praxis procedure 300 may then attempt to match the particle C with a list of current sensors in block 305. As taught in the above mentioned patents, in the current embodiment sensors may be maintained in the K structure as elemental root nodes. Lists of these elemental root nodes may be stored in arrays, hash tables, within the K 14 or a separate K structure or in any other manner understood in those skilled in the art.

For example, refer back to the exemplary structure shown in FIG. 2A, which is a graphical representation of an exemplary interlocking trees datastore. The exemplary interlocking trees datastore includes structure representing the exemplary record CATS ARE FURRY. In this example, a particle C is found, for example, in a sensor array (not shown). Since there is a match, the praxis procedure 300 saves the location of the elemental root node for the C particle to a variable to be used later. In this example, the location which is saved is location 225, as shown in FIG. 2A.

It should be mentioned here that if the particle does not match anything in the sensor list, the ignore sensor process may be performed as shown in block 302 of FIG. 3. The ignore sensor process may choose to discard any particle that is not recognized as a current sensor or delimiter, thereby treating it as noise. One skilled in the art will recognize that these discarded particles may be handled in numerous ways including notifying users via error or log files where other processes may be performed or users may review the contents. If the incoming particle matches something on the sensor list, the procedure of process sensor data block 303 is initiated.

Processing Sensor Data

Figure 4:
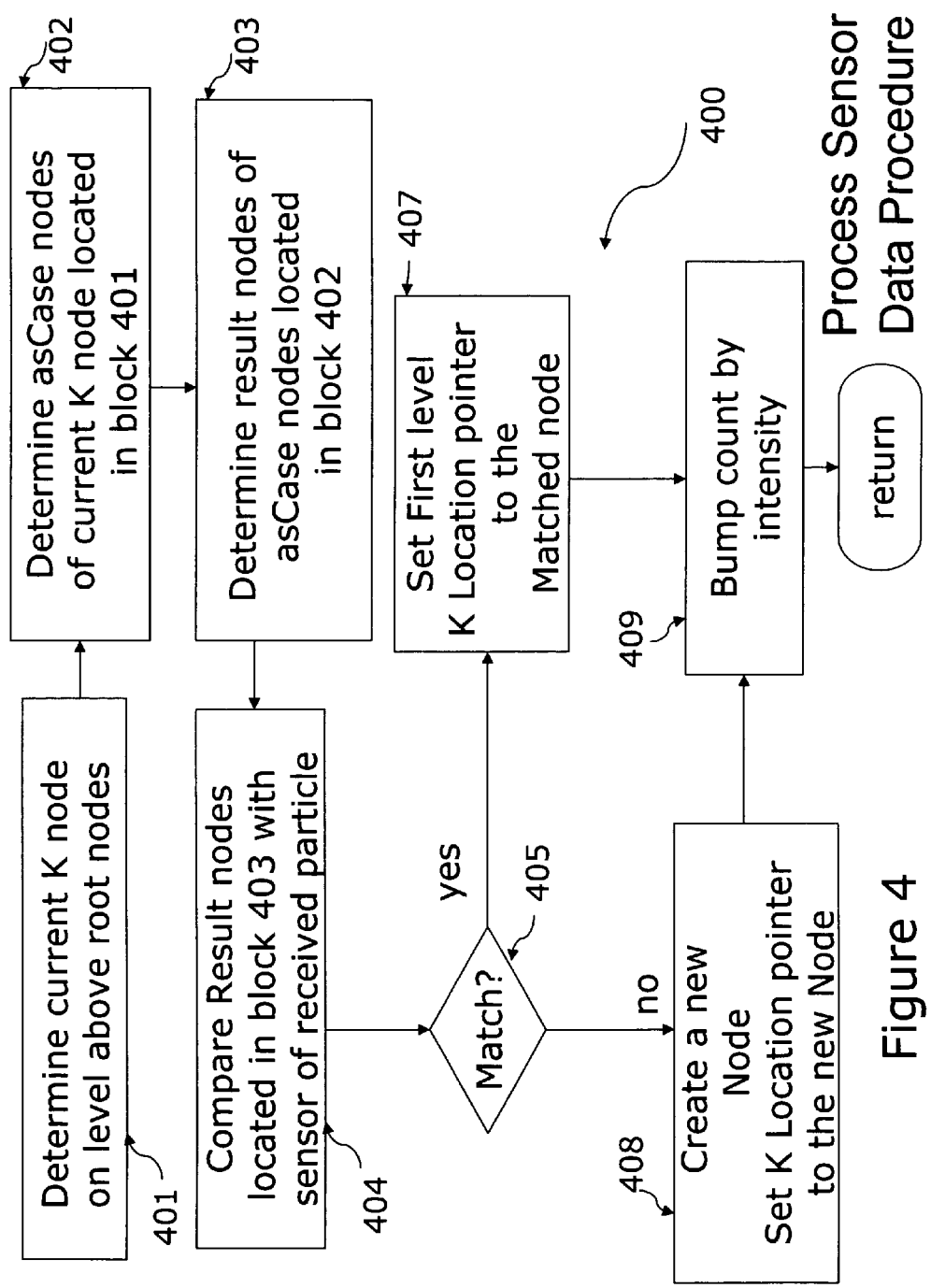
FIG. 4 is a flowchart representation of a procedure for building and accessing a K structure from individual incoming particles of sensed data.

Refer to FIG. 4, which is a flowchart representation of a process sensor data procedure 400 according to the present invention. The process sensor data procedure 400 is suitable for processing sensor data to build or access a K structure according to an incoming particle of sensory data. Initiation of the process sensor data procedure 400 may occur pursuant to execution of the process sensor data block 303 within the praxis procedure 300, when an input particle does not match any entries in the current set of delimiters but does match an entry in the current set of sensors.

As shown in block 401 of the process sensor data procedure 400, the current K node on the current level of the K structure is determined, wherein terms such as "current K node," "current K location" and "current K pointer" are understood to refer to the location of the last experience on a selected level. When block 401 is executed the incoming particle has just been matched with the root node corresponding to the incoming particle according to block 305 of the praxis procedure 300. Therefore, the current level is known to be the level above the elemental root nodes. Accordingly, the current K node of the level above the root nodes is determined in block 401.

In a preferred embodiment of the invention, a list or any other kind of structure, may be maintained to store state variables indicating the current K location corresponding to each level. For example, in the case of a multilevel K structure an array setting forth the correspondence between each level of the K structure and a variable indicating the current node of the level may be provided. The current K locations, or the current K node state data, of the levels of the K are known and stored according to the last event experienced on each level. The array or other data structure storing the current K node state data may be referred to as a state array or state table.

In one preferred embodiment each K location pointer may be used to identify both the current K level and the position on the current K level where the last event was experienced. Additionally, the foregoing structure for storing the correspondence between each level of the K structure and its current K node location pointer may store a list of the current set of delimiters, wherein the delimiters are described above with respect to block 304 of the praxis procedure 300 and in further detail below. However, the delimiter level data may be stored in any manner known to those skilled in the art. The structure may also contain a set of sensors appropriate for that particular level. The array of other data structure storing the current K state may be referred to as the state array or state table.

Furthermore, a correspondence between the defined delimiters and the levels of the K structure may be stored. Storage of this information permits the system to determine a relationship between an input delimiter and a level of the K structure that is being ended by the delimiter. It will be understood that the current K node state data and the delimiter level information do not need to be stored in the same data structure. It will also be understood that multiple delimiters may be appropriate for a single level.

As shown in block 402, the process sensor data procedure 400 may then determine the adjacent nodes of the current K node that was determined in block 401. As well known to those skilled in the art, the adjacent nodes of the current K node are determined by accessing an asCase list pointed to by an asCase pointer of the current K node. The asCase list contains pointers to each of the asCase nodes to be located in block 402. It will be understood by those skilled in the art that the asCase nodes located in this manner contain pointers to their Result nodes.

As shown in block 403, the Result nodes of the asCase nodes found in block 402 are determined according to their Result pointers. As shown in block 404, the Result nodes located in block 403 are then compared with the root node representing the received particle. If a match is found in decision 405 between a Result node of an asCase node found in block 402 and an elemental root node representing an input particle, the matched asCase node becomes the current K node. Therefore, the first level K pointer is advanced to point to the matched asCase node as shown in block 407.

For example, assume that the current K node determined in block 401 is the beginning of thought (BOT) node 200 in FIG. 2A. As described in block 402, the process sensor data procedure 400 determines the asCase nodes of the BOT node 200. In order to do this the asCase list of the BOT node 200 is examined. The nodes in the asCase list of the BOT node 200 are the nodes 205, 210, 215 and 220. It will thus be understood by those skilled in the art that each asCase node 205, 210, 215 and 220 includes a Case pointer pointing to the BOT node 200.

It will also be understood that each asCase node 205, 210; 215 and 220 includes a Result pointer pointing to its Result node. Thus, in block 403 the process sensor data procedure 400 may determine the Result node of each node 205, 210, 215 and 220 on the asCase list of the current K node by following its respective Result pointer to its respective root node. The Result nodes determined in this manner in block 403 may be compared with the elemental root node of the sensor corresponding to the received particle as shown in block 404. A determination may thus be made whether the Result node of any of the nodes 205, 210, 215 and 220 on the asCase list of the current K node match the elemental root node for the sensor of an input particle in block 404 of the process sensor procedure 400. The determination whether there is a match with the elemental root node for the sensor of the input particle may be made in decision 405.

Further to the foregoing example, the input particle in FIG. 2A may be the letter particle C and the root node 225 may correspond to the value C of the input particle. If the Result nodes of the asCase nodes 210, 215, and 220 are compared in block 404 with the root node 225 no matches are found in decision 405 because none of the asCase nodes 210, 215 and 220 has a Result pointer pointing to the C elemental root node 225.

However, the asCase node 205 does contain a Result pointer pointing to the C elemental root node 225. Decision 405 of the process sensor data procedure 400 may therefore find that the Result node of the subcomponent node 205 is a match with the input particle. The current K location pointer may be set to the node +C 205, which has become the current K location of the level as shown in block 407. (For exemplary purposes in the diagrams, when the prefix notation "+" is placed before a value in a node in the figure, it indicates that the prefixed node has a valence, which will be understood to stand in for the entire thought up to but not including the prefixed node.) It will be understood that the asCase nodes of the current K node may be compared in any order and that once a match is found no more comparisons are needed.

In a different example, the current K location could be the subcomponent node 205 and the input particle could be the letter particle A. Pursuant to block 402 the asCase node of the node 205 is determined to be the subcomponent node 206. Since the Result node of the node 206 is the elemental root node representing the letter particle A, a match is found in decision 405. Thus, in block 407 the current K node is incremented to the subcomponent node 206.

Creating New Nodes

In some cases it may turn out that none of the nodes on the asCase list determined in block 402 has a Result pointer pointing to the root node of the input particle. Under these circumstances a match is not found in decision 405. Thus, it may be necessary to create new K structure as shown at block 408. The process of creating a new node is disclosed in several of the references incorporate herein, such as U.S. Pat. No. 6,961,733 and U.S. patent Ser. No. 11/185,620, entitled "Method for Processing New Sequences Being Recorded Into an Interlocking Trees Datastore" for detailed explanation of how new nodes are created. Regardless of whether execution of the process sensor data procedure 400 proceeds by way of block 407 or by way of block 408 the intensity count may be incremented as shown in block 409.

Processing Delimiters

Refer back to FIG. 3, showing the praxis procedure 300. As described in the foregoing description of the process sensor data procedure 400 of FIG. 4, when a sensor is detected by the praxis procedure 300, execution of the praxis procedure 300 may proceed by way of block 303 to process the detected sensor in the process sensor data procedure 400. However, the praxis procedure 300 may detect a delimiter particle rather than a sensor particle in an input particle stream. Under these circumstances the system and method of the invention may execute procedures suitable for processing the received delimiter.

As previously described, after comparing an input particle of data to the current list of delimiters in block 304 of the praxis procedure 300 a decision is made in decision 308 whether there is a match. If the input particle is found to match a currently defined delimiter in decision 308 the procedure of block 301 is initiated in order process the received delimiter. The procedure initiated by block 301 is the process delimiter procedure 500 of FIG. 5A. Before teaching the process delimiter procedure 500 in detail, it is important to understand what delimiters are used for in the preferred embodiment of the invention.

In the preferred embodiment of the invention delimiters are used to indicate the end of a set of particle sequences of data as they are streamed into the K Engine 11. For example, as mentioned above, in the field/record universe, data may come from traditional databases in the format of fields and records.

Figure 6A:
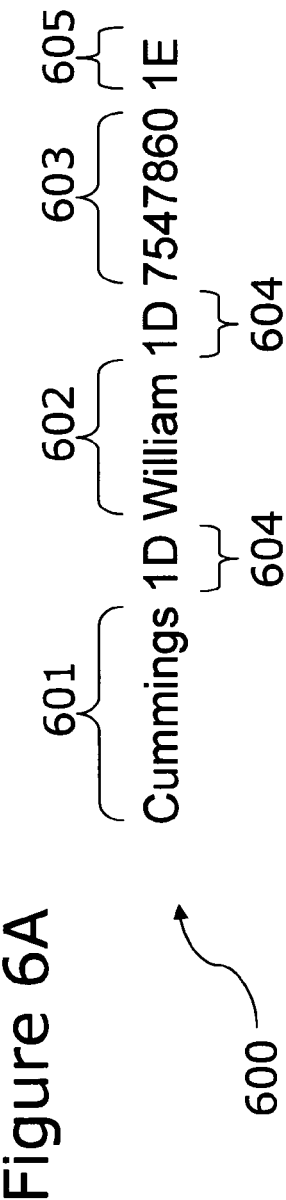
FIG. 6A is a diagram of an exemplary particle stream in a field/record universe of textual data containing a record with three fields and exemplary delimiters that separate each.

Refer to FIG. 6A showing a diagram of an exemplary particle stream 600. The exemplary particle stream 600 may represent a data record that may be stored in the K structure 14 and may therefore be referred to as the exemplary record 600. The exemplary particle stream 600 may represent three fields: Last Name 601, First Name 602, and Telephone Number 603. However, any number of fields of any size can be represented in other field/record universe particle streams, of which the exemplary particle stream 600 is but one example.

The first field in the exemplary particle stream 600 is the Last Name field 601 and is shown with the data sequence Cummings. The second field is the First Name field 602 and is shown with the data sequence William. The third field is the Telephone Number field 603 and is shown with the data sequence 7547860. At the end of the fields 601, 602 there is shown an end of field (EOF) delimiter 1D 604.

The hexadecimal character 1D 604 is thus used as an end of field delimiter for ending the first two fields 601, 602. However, the hexadecimal character 1E 605 is used as both an end of field delimiter for ending the last field 603, and an end of record delimiter for ending the exemplary record 600. As such, it is a single delimiter that ends both the field 603 and exemplary particle stream 600, and, in general, in particle is streams such as the exemplary particle stream 600 a delimiter is not required for closing each level of the KStore.

Thus, significantly, the hexadecimal character 1E 605 may be used to simultaneously end both: (i) its own level in the K structure (the record level), and (ii) a lower level of the K structure (the field level). Accordingly, in the embodiment of the invention represented by the exemplary particle stream 600, each level of a particle stream is not required to have its own separate closing delimiter. Furthermore, a higher level delimiter such as the delimiter 1E may complete any number of incomplete sequences, and thereby close any number of lower levels, in the manner that the field level of the exemplary particle stream 600 is closed.

Since textual data is not the only data that can be particlized and streamed into the K Engine 11, a more generalized explanation of delimiters may be helpful. In general, particles coming into the K Engine 11 may be thought of as incomplete sequences which can operate cooperatively to form complete sequences. Each incomplete sequence can represent an individual particle, set of particles of data, or the absence of particles. Individual incomplete sequences may be streamed into the K Engine 11 to form complete sequences. This is analogous to individual fields (incomplete sequences) such as the fields 601, 602, 603 forming a complete record (complete sequence) such as the complete record 600.

Figure 6B:
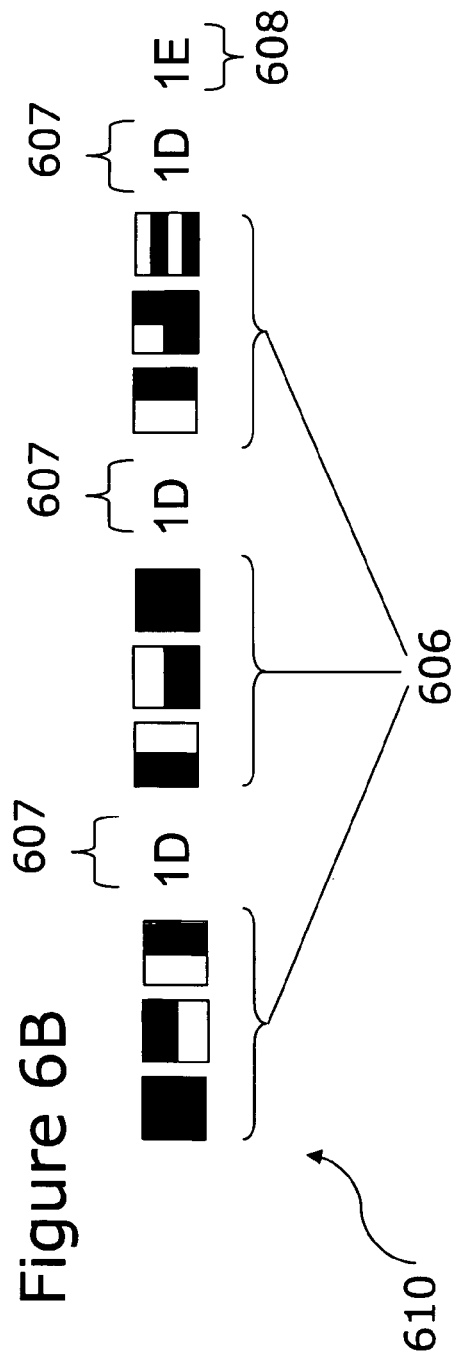
FIG. 6B shows a generalized particlized stream using pixels as the individual data particles and exemplary delimiters that separate each.

FIG. 6B shows a more generalized stream of particles with incomplete sequences 606 making up a complete sequence 610. In FIG. 6B each incomplete sequence 606 is shown as groups of pixels. However, incomplete sequences 606 could easily have been shown with textual data or data from any other data universe. In the complete sequence 610 the EOT delimiter 607 is shown as the hexadecimal character 1D and the final end of product delimiter 608 is shown as the hexadecimal character 1E. This relationship is shown in FIG. 2A at the nodes 265, 282.

Although the hexadecimal characters 1D and 1E are used as delimiters 607, 608 in the illustrative examples, it will be understood that any other particle may be defined to serve as delimiters 607, 608. For example, a comma, another numerical character including characters that are not hexadecimal characters or a specific group of pixels. Thus, delimiters may be any particle that is defined as such for the praxis procedure 300 when the processing of the delimiter particles begins.

It should be noted that incomplete sequences are not limited to single particles of data. An incomplete sequence may be any sequence of data that is experienced before an EOT delimiter is experienced. An incomplete sequence may also include the absence of particles indicating a null value, terminated by an EOT delimiter.

Again referring back to the praxis procedure 300 in FIG. 3, an incoming particle may be compared to a list of currently defined delimiters as shown in block 304. If the input particle matches one of the currently defined delimiters as determined in decision 308, the procedure of process delimiter block 301 can be initiated to process the received delimiter particle. The procedure for processing the received delimiter particle according to process delimiter block 301 is the process delimiter procedure 500 of FIG. 5A.

Figure 5A:
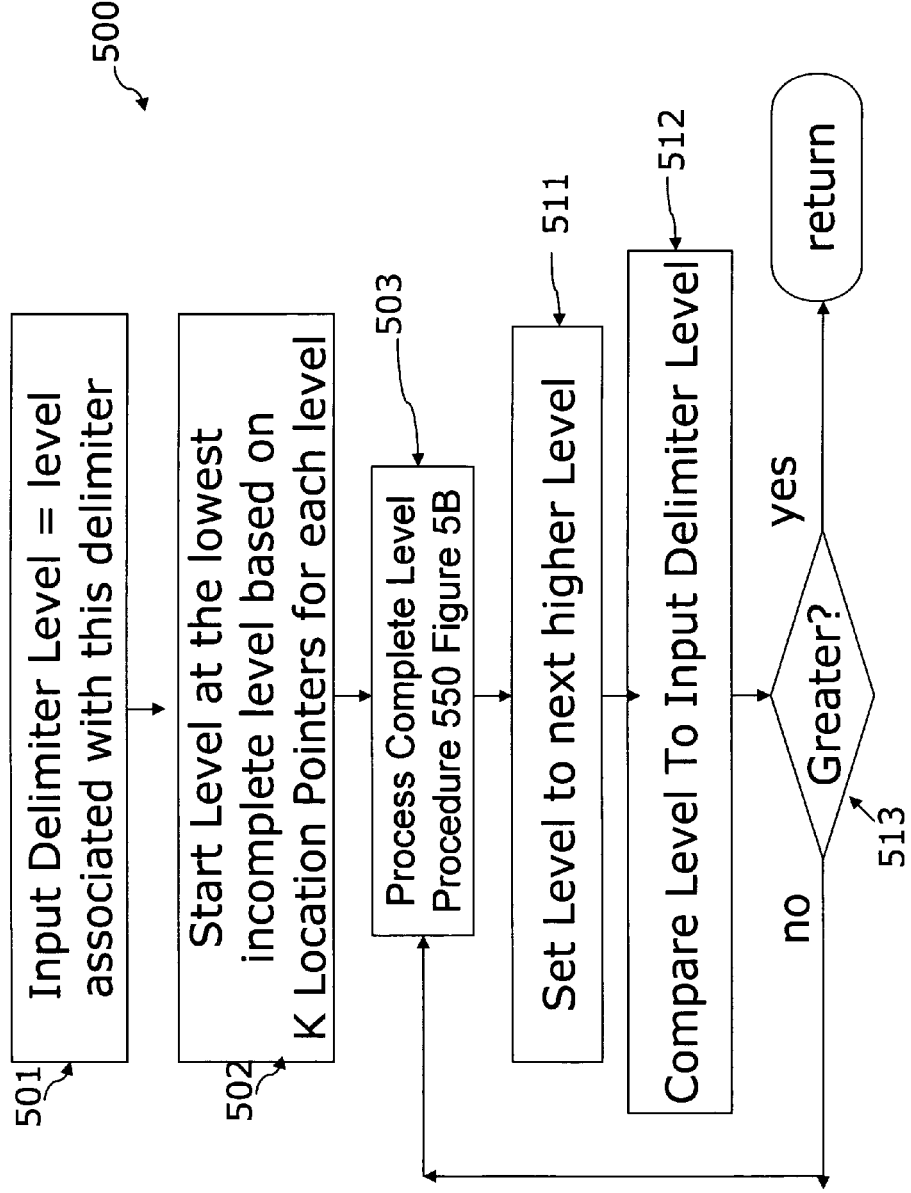
FIG. 5A is a flowchart representation of a procedure for processing a delimiter.

Refer now to FIG. 5A, which is a flowchart representation of the process delimiter procedure 500 for processing delimiters found in an input particle stream. The process delimiter procedure 500 can be initiated by the process delimiter block 301 of the praxis procedure 300 when a match is found between an input particle and an entry on the list of currently defined delimiters by decision 308.

As previously described, it is possible for the praxis procedure 300 to receive a higher level delimiter for completing its own level of the K structure while lower levels of K structure are still incomplete. Under these circumstances, the higher level delimiter may complete as many incomplete lower levels as necessary prior to completing its own level.

For example, refer above to the exemplary particle stream 600 shown in FIG. 6A. An EOF delimiter hexadecimal 1D 604 is shown at the ends of the fields 601, 602. The hexadecimal delimiter character 1D 604 is thus used as the delimiter for the first two fields 601, 602. However, there is no delimiter character 1D 604 at the end of the field 603. Rather, only the hexadecimal delimiter character 1E 605 is shown at the end of the field 603, wherein it is understood that the level of the delimiter character 1E 605 is higher than the level of the field 603. Therefore, the received delimiter character 1E 605 is used to indicate both the end of the last field 603, and the end of the exemplary particle stream 600. Under these circumstances, the received delimiter character 605 performs both the operation of completing the incomplete sequence 603, at a lower level, and the operation of ending the record 600, at a higher level.

Thus, at the time the delimiter character 605 is received: (i) the field 603 represents an incomplete sequence on an incomplete lower level, and (ii) the delimiter character 605 is a delimiter for a higher level of K structure than the current level of field 603. Accordingly, the system and method of the present invention may determine both: (i) that the level of the field 603 must be completed, and (ii) that the level of the record 600 must be completed. Additionally, the system and method of the present invention may perform the operations necessary for completing both the field 603 and the record 600.

Furthermore, those skilled in the art will understand that a received delimiter may indicate the end of any number of lower levels in the manner that the delimiter character 605 indicates the end of only a single lower level. Accordingly, the system and method of the invention may perform the operations necessary for completing as many lower levels as required in addition to completing the level of the received delimiter.

Therefore, the process delimiter procedure 500 of FIG. 5A is provided to perform the operations of completing as many incomplete levels as necessary below the level of a received delimiter, as well as completing the level of the received delimiter itself. In block 501 of the process delimiter procedure 500 the level associated with the input delimiter is determined. This determination may be made according to a list of currently defined delimiters and the K location structure or state structure setting forth the corresponding delimiter level as previously described. Additionally, the variable Input Delimiter Level is set equal to the determined level in block 501.

As previously described in the current embodiment, sets of particle sequences, such as the sets of sequences forming the incomplete sequences 606 in FIG. 6A, may be entered into the K structure 14 in levels. Thus, in effect, hierarchy is determined by the organization or location of the delimiters. For example, any number of levels may appear in a K structure and multiple types of end product nodes may be present in any one level. Refer back to FIG. 2A. The interlocking trees datastore shown in FIG. 2A includes three exemplary levels: 0, 1 and 2. An individual K structure is not limited to three levels and may contain as many as necessary. Note that the level numbers indicated in these descriptions are used for the sake of clarity of the discussion. Levels may be linked by any means desired with the concept of an "upper" level being relative to whatever linked structure is utilized. The structure used to link the levels, as discussed previously for the K location pointers or state structure, may be an array, a linked list, a K structure or any other structure known to those skilled in the art.

Level 0 (230) of the K shown in FIG. 2A may represent the elemental root nodes. For example, using field/record textual universe data of FIG. 2A, level 0 may represent the elemental root nodes 200, 225, 271, 265, or 282 as well as the other elemental root nodes that have not been provided with reference numerals in FIG. 2A.

Level 1 (235) may represent the subcomponent nodes and end product nodes of the paths 240, 245 and 250. The Result pointers of the nodes in level 1 point to the elemental root nodes in level 0.

For example, the path 240 includes the nodes 200, 205, 206, 207, 208 and 260. Assume that a delimiter for end of field, such as the delimiter 1D 265 similar to the delimiter 1D 604 in FIG. 6A, is recognized while the K location pointer for level 1 is positioned at the exemplary node 208. The nodes of the path 240 from the BOT node 200 to the node 208 thus represent an incomplete sequence for the exemplary sequence BOT-C-A-T-S. The delimiter 1D 265 recognized at this point indicates the termination of the field sequence from the BOT node 200 to the node 208. Thus, an end product node 260 may be built. The addition of the end product node 260, having the EOT delimiter 1D 265 as its Result node, completes the incomplete sequence, and the exemplary word CATS is thus represented by the path 240. It is the recognition of a delimiter 1D in this manner, after experiencing an incomplete sequence, that completes the sequence.

Level 2 (255) represents the subcomponent nodes whose Result pointers point to the complete sequences of level 1 in FIG. 2A. The complete sequences of level 1 are represented by the end product nodes +CATS 260, +ARE 270 and +FURRY 275. The addition of the end product node 283, having the EOT delimiter 1E 282 as its Result node, may be used to complete the incomplete sequence, thus completing the record CATS ARE FURRY.

Referring back to FIG. 5A. As explained above, in block 501 of the process delimiter procedure 500 an incoming delimiter is associated with its defined level within the interlocking trees datastore and the variable Input Delimiter Level is set equal to the associated level. For example, within a field/record universe the exemplary hexadecimal character 1D 607 in FIG. 6A may be used to represent the end of a field 606 (i.e. the end of a complete field sequence) as previously described. As also described, the exemplary hexadecimal character 1E may be used to represent the end of a record (i.e. the end of a complete record sequence). Both of the delimiters 1D, 1E in the current embodiment may initiate processing that indicates completion of a specific level within the K structure. Thus, the level is identified with which the experienced delimiter is associated.

The process delimiter procedure 500 may next determine which, if any, levels lower than Input Delimiter Level are incomplete at the time the input delimiter is received. This determination may be made with reference to the list of the current K nodes in the K structure. As previously described, this list may contain the current K pointers for each level of the K structure. In one embodiment the K location pointer for each level may indicate the node in that level where the last event for that level was experienced, and the K location pointer for completed levels can point to any location designated as a sequence beginning location. In one preferred embodiment the sequence beginning location can be the BOT node 200. The process for ending the incomplete sequences located in this manner may begin with the lowest such level as shown in block 502. The lowest such level, in general, can be any level of the KStore. Execution of the process delimiter procedure 500 may then proceed to block 503 where the process complete level procedure 550 of FIG. 5B is initiated in order to begin ending incomplete sequences as necessary.

For example, in FIG. 2A, assume that a previous particle S 271 in the sequence BOT-C-A-T-S was the last particle sensed in level 1 (235). The sensing of the particle S 271 may permit the forming of the incomplete sequence at the node 208, as previously described. At this point, the K location pointer for level 1 points to the node 208, thereby indicating that the last event experienced on level 1 (235) was at the node 208. Thus, level 1 is incomplete at this point. Therefore, level 1 is the starting level determined in block 502 of the process delimiter procedure 500 when a delimiter 1D is received. The incomplete sequence +S 208 may be completed by the process complete level block 503 which initiates the process complete level procedure 550 of FIG. 5B.

Refer to FIG. 5B, which shows the process complete level procedure 550. In a preferred embodiment of the invention, the process complete level procedure 550 is initiated by the execution of block 503 of the process delimiter procedure 500 when an incomplete level is determined. The process complete level procedure 550 is adapted to complete the processing of the incomplete levels determined in block 502. The presence of unfinished lower level can be determined with reference to the table of current K node pointers of each level as previously described. The lower levels are closed starting from the lowest incomplete level and proceeding upward through the determined level.

In block 504 of FIG. 5B, the Result nodes of the asCase nodes of the current K node are compared with the determined delimiter. The process of block 504 is substantially similar to the operations of blocks 401-404 of the process sensor data procedure 400 described above. In decision 505 a decision is made whether any of the asCase nodes of the current K location for the determined current K level have a Result node that matches the root node for the determined delimiter. If no matches are found in decision 505 an end product node has not been built and processing continues to is block 506. In block 506 a new end product node can be created in order to complete the incomplete sequence of the determined current K level and the current K location pointer is set to the new node.

Figure 2B:
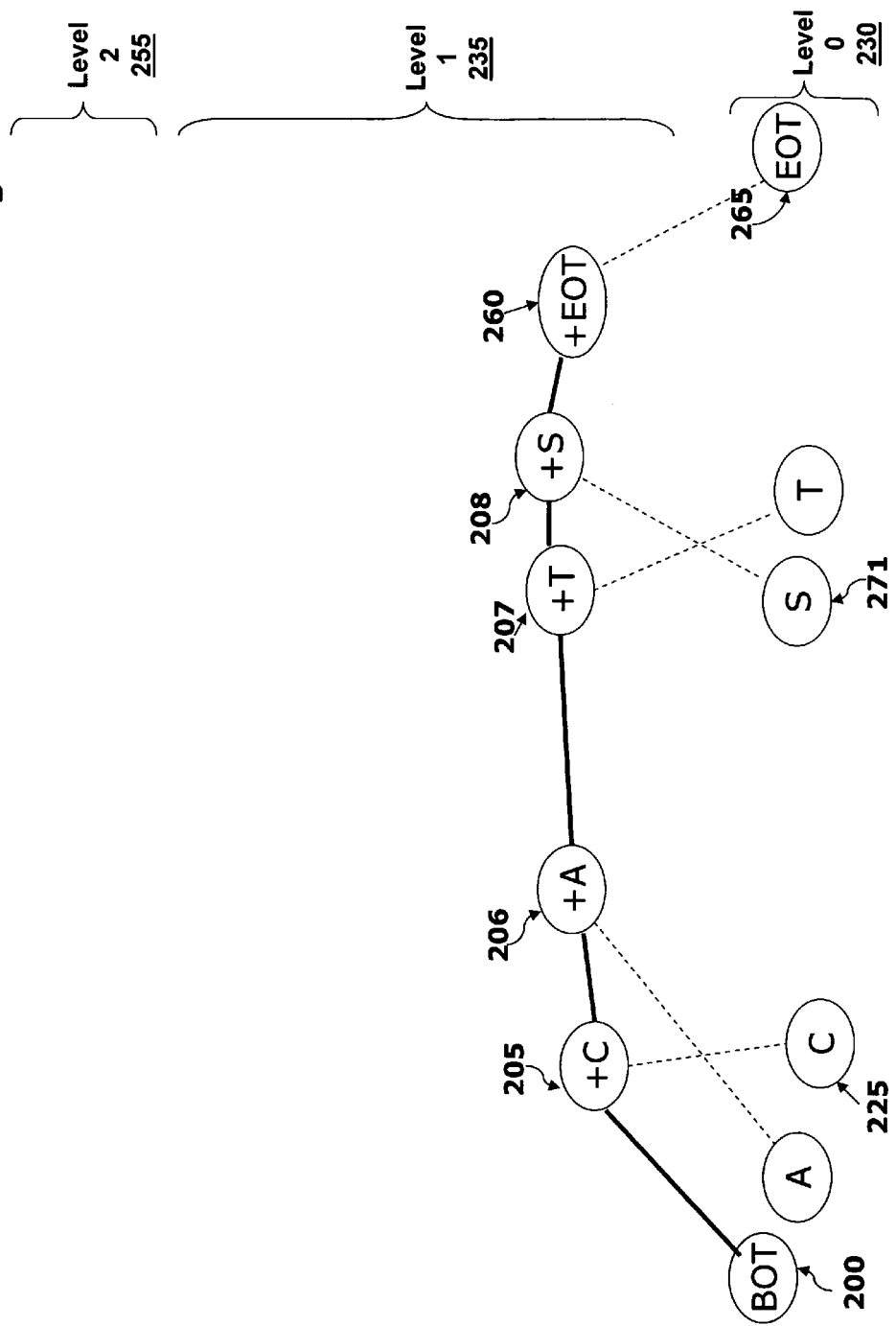
FIG. 2B is a graphical representation of a portion of the interlocking trees datastore of FIG. 2A showing a structure representing the word CATS.

Refer to FIG. 2B, which illustrates a K structure in the process of being built. In this exemplary figure, assume again that the node 208 is the last node formed and that the input particle received matched the level 1 delimiter 1D. Therefore, the K location pointer for level 1 points to the node 208. As explained above, the asCase list of the current K node 208 is checked. It is determined by decision 505 that there are no nodes in the asCase list of node 208. Therefore, processing of the process complete level procedure 550 proceeds to block 506 where the end product node 260 is created. The end product node 260 created in this manner links the node 208 to the elemental root node 265 for the field delimiter 1D for the current level which in this case is level 1. The K location pointer for level 1 is then set to the node 260 where it indicates that the level is complete. In this exemplary figure, the end product node 260 is in level 1.

In a further example of the case in which execution of the process complete level procedure 550 proceeds from decision 505 and builds a new node, assume that the current K pointer is pointing to the subcomponent node 274 of FIG. 2A when the delimiter 1D is received. If the +EOT node 275 has not previously been built the decision 505 of the process complete level procedure 550 will not find any asCase nodes. Under these circumstances processing may proceed to block 506 where the end product node 275 may be created, as described in the foregoing example.

However, when an end product asCase node of a current K node has already been experienced and built, execution of the process complete level procedure 550 may proceed from decision 505 to block 507. For example, if the field represented by the path 250 has previously been experienced by the K structure at least once, the asCase list of the node 274 is not empty. Thus, a comparison between the Result node of the asCase node 275 and the elemental root node for the delimiter may be positive. In the current example, such a match is found because the asCase node (the node 275) of the current K node (274) does, in fact, have a Result pointer pointing to the ID delimiter sensor 265.

Thus, in this example, execution of the process complete level procedure 550 may proceed to block 507. In block 507 the previously existing node 275 may become the current K node and the count of the nodes may be incremented.

Whether execution of the process complete level procedure 550 proceeds by way of block 506 to create a new node and advance the current K pointer, or by way of block 507 to merely advance the current K pointer to a preexisting node, the count of the node is incremented and a determination is made whether there are potentially any higher levels above the current level as shown in decision 508. The determination whether there are higher levels is made by accessing the list of defined delimiters as previously described and determining where the determined delimiter is located in the defined hierarchy.

If there are no levels higher than the current K level, the K location pointer is set to the BOT node 200 to indicate that the current K level is complete as shown in block 509. The system may then wait for the next input particle. Processing by the process complete level procedure 550 is then complete. Processing may then return to the process delimiter procedure 500 in FIG. 5A and proceed from block 503 to block 511. If there is a higher level in the K structure, as determined in block 508, processing continues to the process upper level subcomponent block 510 where a subcomponent node may be built if necessary. The processing performed by the process upper level subcomponent block 510 initiates the process upper level subcomponent procedure 590 shown in FIG. 5C.

Figure 5C:
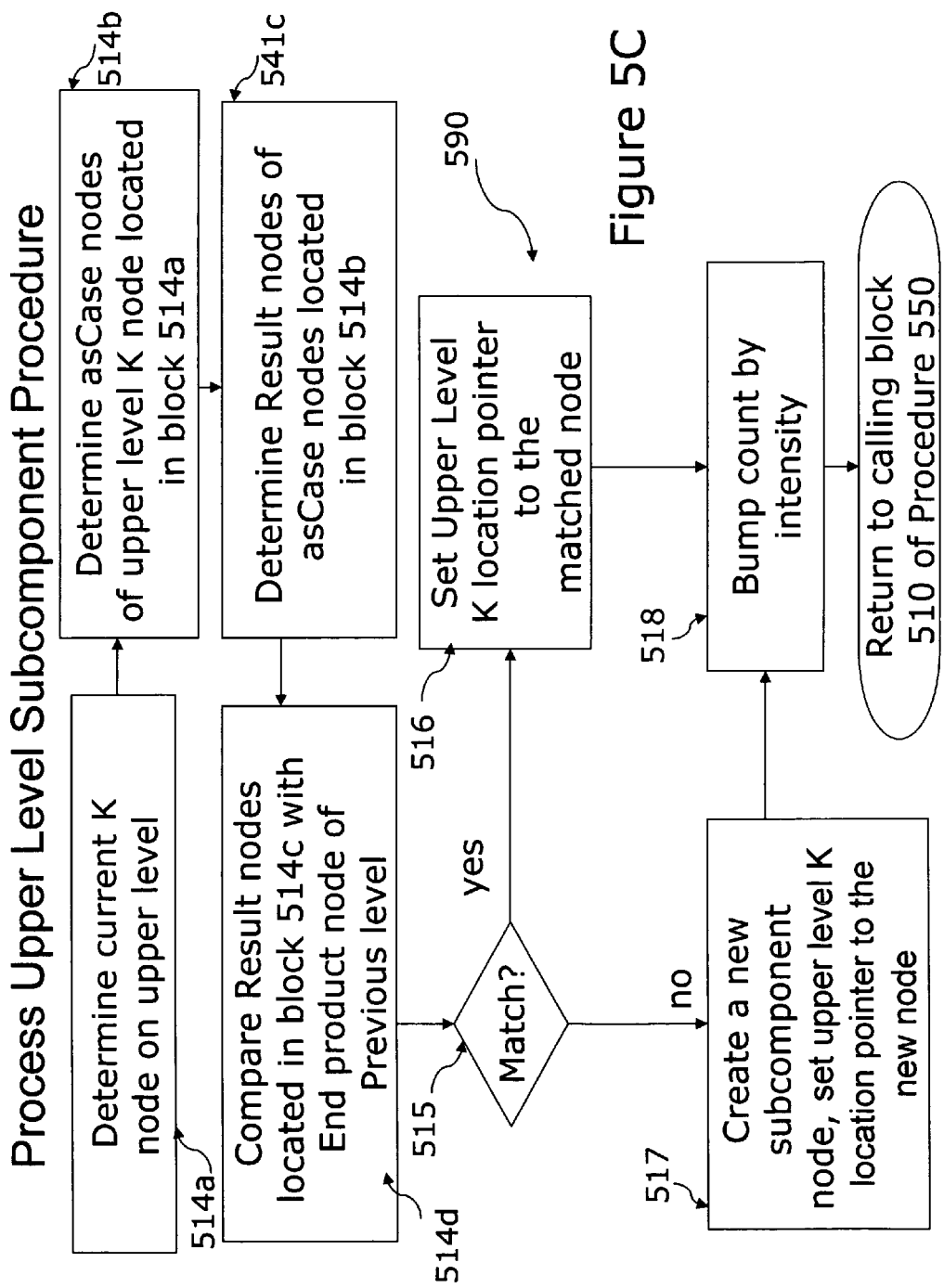
FIG. 5C is a flowchart representation of a procedure for processing a is delimiter and creating and accessing upper level subcomponent nodes.

Refer to FIG. 5C, which is a flowchart representation of the process upper level subcomponent procedure 590. The process upper level subcomponent procedure 590 is initiated by process upper level subcomponent node block 510 of the process complete level procedure 500.

The upper level subcomponent procedure 590 may begin with blocks 514a-d. The operations of blocks 514a-d of the process upper level subcomponent procedure 590 are substantially similar to the operations of blocks 401-404 of the process sensor data procedure 400 described above.

As shown in block 514a, the current K node on the upper level may be determined. For example, referring back to FIG. 2B, the current K node on the upper level (255) may be the BOT node 200. As shown in block 514b, the asCase list of the BOT node 200 may be used to locate the asCase nodes of the BOT node 200. The node 205 is thus located. As shown in block 514c, the Result pointers of the asCase nodes of the BOT node 200 are followed to find any Result nodes. The elemental root node 225 is thus located. As shown in block 514d, the Result node located in this manner is compared with the end product node for the previous level node 260.

In decision 515 a decision is made whether any of the asCase nodes of the current K location for the current level have a Result node that matches the root node or end product node for the previous level. If there is a match the upper level K location pointer is set to the matched node as shown in block 516. However, if the end product node has not been experienced before at this level then no matches are found by decision 515 and processing continues to block 517. In block 517 a new subcomponent node may be created in the higher level and the current K location pointer for the higher level may be set to the new node.

Figure 2C:
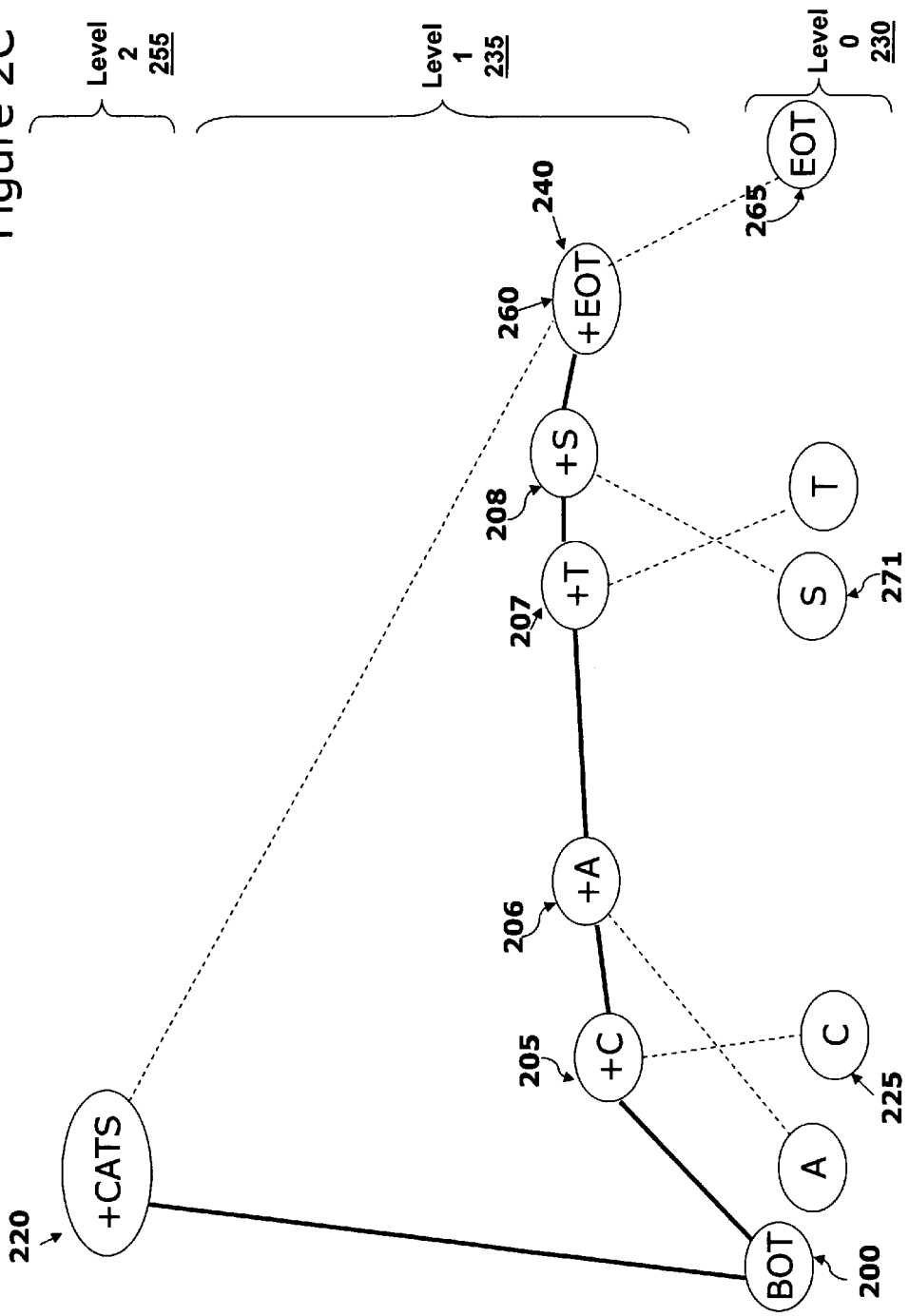
FIG. 2C is a graphical representation of a portion of the interlocking trees datastore of FIG. 2A showing a structure representing the word CATS.

For example, refer to FIG. 2C, which is a graphical representation of a portion of an interlocking trees datastore, for example, a portion of the interlocking trees datastore that was originally shown in FIG. 2A. The datastore in FIG. 2C was previously begun in FIG. 2B, as previously described. However, the datastore of FIG. 2C has an additional node, not present in the datastore of FIG. 2B, the level 2 subcomponent node 220 representing the sequence BOT-CATS. The Result node of the node 220 is the +EOT node 260 of level 1. The +EOT node 260 is the end product node of the path 240 representing BOT-C-A-T-S-EOT.

Further to FIG. 2B, the current K location for the upper level or level 2 (255), is the BOT node 200. At this point the asCase list of the BOT node 200 is checked and found to contain only one node, the node 205. The Result pointer for the node 205 is then checked and found to point to the elemental root node 225. The elemental root node 255 represents the particle C.

The elemental root node 205 thus does not match the end product node pointed to by the K location pointer for level 1, the +EOT node 260. Now refer to FIG. 2C. In FIG. 2C, a new subcomponent node may be created at the upper level (255), which in this exemplary case is the BOT-CATS node 220. The subcomponent node 220 is then set as the current K location node for the upper level. Processing then returns to FIG. 5B and proceeds from block 510 to block 509 where the current K location pointer for level 1 (235) is set to the node BOT 200. After completion of block 509 the K location pointer for level 1 points to the BOT node 200 and the K location pointer of level 2 points to the node 220. Processing may then continue to block 511 of FIG. 5A by way of calling block 503. Processing Upper Levels.

The foregoing descriptions disclose how delimiters may signal the end of complete sequences at lower levels (e.g. field levels in a field/record data universe). The following discussion discloses how delimiters are used to signal the end of complete sequences at upper levels (e.g. record levels in a field/record data universe). In this part of the explanation, assume that portions of an upper level have already been established.

It will be understood that to some extent the procedures for completing upper levels are similar to those for completing the lower levels as they were previously described. Therefore, where the following procedures are similar to those that have previously been taught above, the explanation may refer back to the earlier explanations. Also, the following discussion is taught using the exemplary delimiters from the field/record universe. And, before continuing, some assumptions may be made before explaining in detail how the upper level delimiters are processed.

Process Upper Level when Lower Levels are Complete

Assume in the following discussion that a K structure such as K 14 shown in FIG. 2A continues to be built. Also assume that the lower level delimiters (e.g. the 1D delimiter in the exemplary case) are experienced at the end of incomplete sequences, thereby completing the incomplete sequences. Also assume that eventually an upper level delimiter, e.g. 1E in a field/record universe, is experienced. Again, it should be noted that particles from a field/record universe are not the only particles that the K Engine 11 may process. Additionally, the delimiters used in the following examples (hexadecimal characters 1D and 1E) are not the only delimiters that may be used within the KStore system. Furthermore, those skilled in the art will realize that the praxis procedure 300 of the invention is not limited to field/record data, and that any data that can be digitized (e.g. pixels) may be represented as a K structure through the praxis procedure 300.

As mentioned above, the following discussion uses the K structure shown in FIG. 2A to explain the process of completing the upper levels of a K structure. As the following discussion begins, refer to FIG. 2A and assume the following about each level.

Level 0 (230)—Contains all of the elemental root nodes of the K Store 14.

Level 1 (235)—The paths 240, 245, and 250 are complete. The K location pointer for level 1 points to the BOT node 200.

Level 2 (255)—The sequences that can be represented by the subcomponent nodes 220, 280, and 281 have been processed and the K location pointer for the level 2 points to the node 281.

As the following discussion begins, the next particle that is experienced is the delimiter 1E, wherein the delimiter 1E closes its own level (level 2) as shown in the exemplary particle string 610 of FIG. 6A.

As explained above, the praxis process 300 shown in FIG. 3 begins in block 304 by determining whether the received particle is a currently defined delimiter. Since the particle is a delimiter, execution proceeds to the process delimiter procedure 500 of FIG. 5A by way of block 301 of FIG. 3.

Refer back to the process delimiter procedure 500 in FIG. 5A, which is a flowchart representation of a procedure for processing delimiters. Since in the example the received hexadecimal character 1E is defined to represent an end of record, it is known that this delimiter is associated with level 2 (255) by accessing the delimiter level data or state structure as shown in block 501. The process shown in block 502 determines that the lowest incomplete level is level 2 (255) because the K location pointer for level 1 (235) is at BOT node 200.

Again, as explained above in detail, the process complete level procedure 550 shown in FIG. 5B is initiated by way of block 503. The procedure steps shown in blocks 504, 505 and 506 are completed and the end product node +EOT 283 is created in block 506 and set as the K location pointer for level 2. When the procedure 550 reaches block 508, a determination is made whether there are any potentially higher levels within the KStore. In the exemplary case, no other higher level delimiters are defined beyond the hexadecimal character 1E. Thus, there are no other higher levels in the K. Therefore, the K location pointer for level 2 (255) is set to the BOT node 200 as shown in FIG. 2A and block 509 of FIG. 5B.

From block 509, the process complete level procedure 550 returns to the calling block 510 in FIG. 5A and proceeds to block 511. In block 511 the level is set to the next upper level. Since there is no level higher than this one, the current level is set to a value larger than the maximum level, in this case level 3. In blocks 512 the current level is compared to the Input Delimiter Level and in block 513 of the procedure 500 determines whether the current level is greater than the level of the input delimiter. In the example, the input delimiter is at level 2. Since level 3 is greater than level 2, the question in decision block 513 is answered YES, indicating completion of the delimiter processing in the procedure 500. Execution may then return to block 303 of the praxis procedure 300 in FIG. 3.

At this point the praxis procedure 300 may return to its calling procedure, block 301, where the system awaits the next incoming particle.

Process Upper Level when Lower Levels are not Complete

Assume in the following discussion that a K structure such as K 14 shown in FIG. 2A continues to be built. Also assume that the last lower level delimiter (e.g. the 1D delimiter in the exemplary case) has not yet been experienced at the end of the last incomplete sequence. Also assume that eventually an upper level delimiter, e.g. 1E in a field/record universe, is experienced. Again, it should be noted that particles from a field/record universe are not the only particles that the K Engine 11 may process. Additionally, the delimiters used in the following examples (hexadecimal characters 1D and 1E) are not the only delimiters that may be used within the KStore system. Furthermore, those skilled in the art will realize that the praxis procedure 300 of the invention is not limited to field/record data, and that any data that can be digitized (e.g. pixels) may be represented as a K structure through the praxis procedure 300.

As mentioned above, the following discussion uses the K structure shown in FIG. 2A to explain the process of completing the upper levels of a K structure. As the following discussion begins, refer to FIG. 2A and assume the following about each level.

Level 0 (230)—Contains all of the elemental root nodes of the KStore 14.

Level 1 (235)—The paths 240 and 245 are complete. Within the path 250, the sequences that may be represented by the nodes 215, 216, 272, 273 and 274 have been experienced, and the K location pointer for level 1 points to the node 274.

Level 2 (255)—The sequences that may be represented by the subcomponent nodes 220 and 280 have been processed and the K location pointer for the level 2 points to the node 280.

As the following discussion begins, the next particle that is experienced is the delimiter 1E, wherein the delimiter 1E closes both its own level (level 2) and the level below it (level 1) as shown in the exemplary particle string 600 of FIG. 6A. Thus, in general, in particle streams such as the exemplary particle stream 600 a delimiter is not required for closing each level of the KStore.

As explained above, the praxis process 300 shown in FIG. 3 begins in block 304 by determining whether the received particle is a currently defined delimiter. Since the particle is a delimiter, execution proceeds to the process delimiter procedure 500 of FIG. 5A by way of block 301 of FIG. 3.

Refer back to the process delimiter procedure 500 in FIG. 5A, which is a flowchart representation of a procedure for processing delimiters. Since in the example the received hexadecimal character 1E is defined to represent an end of record, it is known that this delimiter is associated with level 2 (255) by accessing the delimiter level data or state structure as previously described. The process shown in block 502 determines that the lowest incomplete level is level 1 (235) because the K location pointer for level 1 (235) is not at BOT node 200. Rather, it points to the subcomponent node 274 of the K path 250 within level 1 (235) in the current example. It is also determined from the delimiter level data or state structure that the delimiter for level 1 is 1D.

As explained above, the process delimiter procedure 500 may proceed by way of block 503 to initiate the process complete level procedure 550 of FIG. 5B, in order to complete the incomplete lower level 1 (235) of the K before processing the upper level (255). The level, level 1, and the determined delimiter, 1D, are passed to the process complete level procedure. In block 504 the asCase node of the K location pointer for this level (level 1), node 274, if any, is located. If the +EOT node 275 has already been created there is a match in decision 505 between its Result node 265 and the determined delimiter, wherein it is understood that the determined delimiter 1D is the delimiter associated with level 1 (235). The current K node for level 1 is advanced to point to the +EOT node 275 in block 507 and the intensity is incremented.

If the +EOT node 275 has not already been created, there is no end product node and no match in decision 505. The process complete level procedure 550 may then proceed to block 506 where the +EOT node 275 may be created. Since the new node is to be located on level 1 (235) the Result node of the new +EOT node 275 is set to EOT 1D 265.

The procedure 550 may increment the count and proceed to decision 508 where a determination may be made whether there are any higher levels. Because there is a level above level 1 (235), namely level 2 (255), the process upper level subcomponent procedure 590 of FIG. 5C is initiated by way of block 510.

As the process upper level subcomponent procedure 590 of FIG. 5C is initiated by way of block 510 of FIG. 5B, the procedures in blocks 514a-d are performed. In these operations the asCase nodes, if any, of the current K node (the node 280) of level 2 (255) may be located. The Result nodes of any asCase nodes located can be compared to the end product node for the previous level. In the current example the asCase node 281 may be located. The Result node of the asCase node 281 is compared with the end product or root node of the previous level or node 275. Since node 275 matches the K location pointer for the previous level, the K location pointer for the upper level or level 2 is set to node 281 representing "BOT-CATS-ARE-FURRY", as shown in FIG. 2A. If there had been no match a new subcomponent node would have been created in block 517 and the current K location for level 2 advanced to the newly created node. The process returns to FIG. 5B block 509, at which point the K location pointer for level 1 is set to BOT. The process then returns to FIG. 5A block 511.

The current level is then set to the next highest level in block 511 of the process delimiter procedure 500. In the current example the next highest level is delimiter level 2 (255). This is the record level in the field/record universe of data of the current example. As shown in block 512 of the process delimiter procedure 500 the new level is compared to the variable Input Delimiter Level of block 501. In the example, the input delimiter is 1E, which represents level 2 (235), and the current K level is also level 2 (235). In the decision block 513 a determination is made whether the current K level is greater than the variable Input Delimiter Level. Since both level numbers are 2 in the current example the answer to decision 513 is NO. The process delimiter procedure 500 may therefore proceed from the decision 513 by way of the process complete level block 503 to the process complete level procedure 550 of FIG. 5B to complete the processing for level 2 (255).

Again, as explained above in detail, the process complete level procedure 550 shown in FIG. 5B is initiated. The procedure steps shown in blocks 504, 505 and 506 are completed and the end product node +EOT 283 is set as the K location pointer for level 2. When the procedure 550 reaches block 508, a determination is made whether there are any potentially higher levels within the KStore. In the exemplary case, no other higher level delimiters are defined beyond the hexadecimal character 1E. Thus, there are no other higher levels in the K. Therefore, the K location pointer for level 2 (255) is set to the BOT node 200 as shown in FIG. 2A and block 509 of FIG. 5B.

From block 509, the process complete level procedure 550 returns to the calling block 510 in FIG. 5A and proceeds to block 511. In block 511 the level is set to the next upper level. Since there is no level higher than this one, the current level is set to a value larger than the maximum level or, in this case, level 3. In blocks 512 the current level is compared to the Input Delimiter Level and in block 513 of the procedure 500 determines whether the current level is greater than the level of the input delimiter. In the example, the input delimiter is at level 2. Since level 3 is greater than level 2, the question in decision block 513 is answered YES, indicating completion of the delimiter processing in the procedure 500. Execution may then return to block 303 of the praxis procedure 300 in FIG. 3. At this point the praxis procedure 300 may return to its calling procedure, block 309, where the system may await the next incoming particle.

Count Fields

While count fields within interlocking trees datastores have been discussed in Ser. No. 10/666,382, the following disclosure teaches some preferred uses. As has been previously taught, the K nodes of an interlocking trees data store may include additional fields representing any type of information associated with the nodes. This may be illustrated using FIG. 7 which shows the exemplary node 700/701. Additional fields 703 within the K nodes may be used to store a count, a node type indicator or any other information about the nodes if desired. The node 700/701 may include a count field 702 and other additional fields 703 which may have many uses. Thus, nodes such as the node 700/701 need not be limited to one additional field. Often, however, an additional field can contain a count. The count field 702 may be initialized and/or incremented with an intensity variable. The value of the intensity variable can vary with conditions within the system when the count field is being referenced.

An intensity variable can be defined as a mathematical entity holding at least one value. A simple example of an intensity variable can be a single ordinal field value, such as 1, to be used to increment or decrement count fields 702 to record the number of times that a node is accessed or traversed within a K Store. By making this term so broad a intensity variable populated count field 702 can be used for applications of the inventive interlocking trees structure dealing with learning, forgetting, erroneous recorded data, recording which entity is doing an inquiry, recording the type of inquiry being used and other processes of interest which may be occurring when using the data.

The count field 702 is added to a node 700/701 in order facilitate the use of the knowledge store represented by the interlocking trees structure and is particularly useful when statistics, such as frequency and probability, are sought.

Count Fields 702 and the Praxis Procedure 300

Refer back to FIG. 4, which shows a high level flowchart of the procedure 400, showing how sensors can be processed in accordance with the present invention. After a new node has been created as shown in block 408, or when the K location pointer has been set to a matched node as shown in block 407, counts within the referenced nodes may be increased or decreased as shown in block 409 depending on different situations. Similar updates to the count fields 702 can occur in FIGS. 5B and 5C. This process will be explained in more detail below.

Incrementing Count

Typically, the count is incremented for learning functions and not incremented for query functions. As an example of this in a field/record universe, the count field 702 for each K node traversed can be incremented by 1 as new transaction records are recorded into the K. Newly created K nodes can be initialized to 1. An example of a case in which a count field 702 is not incremented within a K Store is a dictionary spell checker in which a user is not concerned about the number of times a word is misspelled.

Figure 9A:
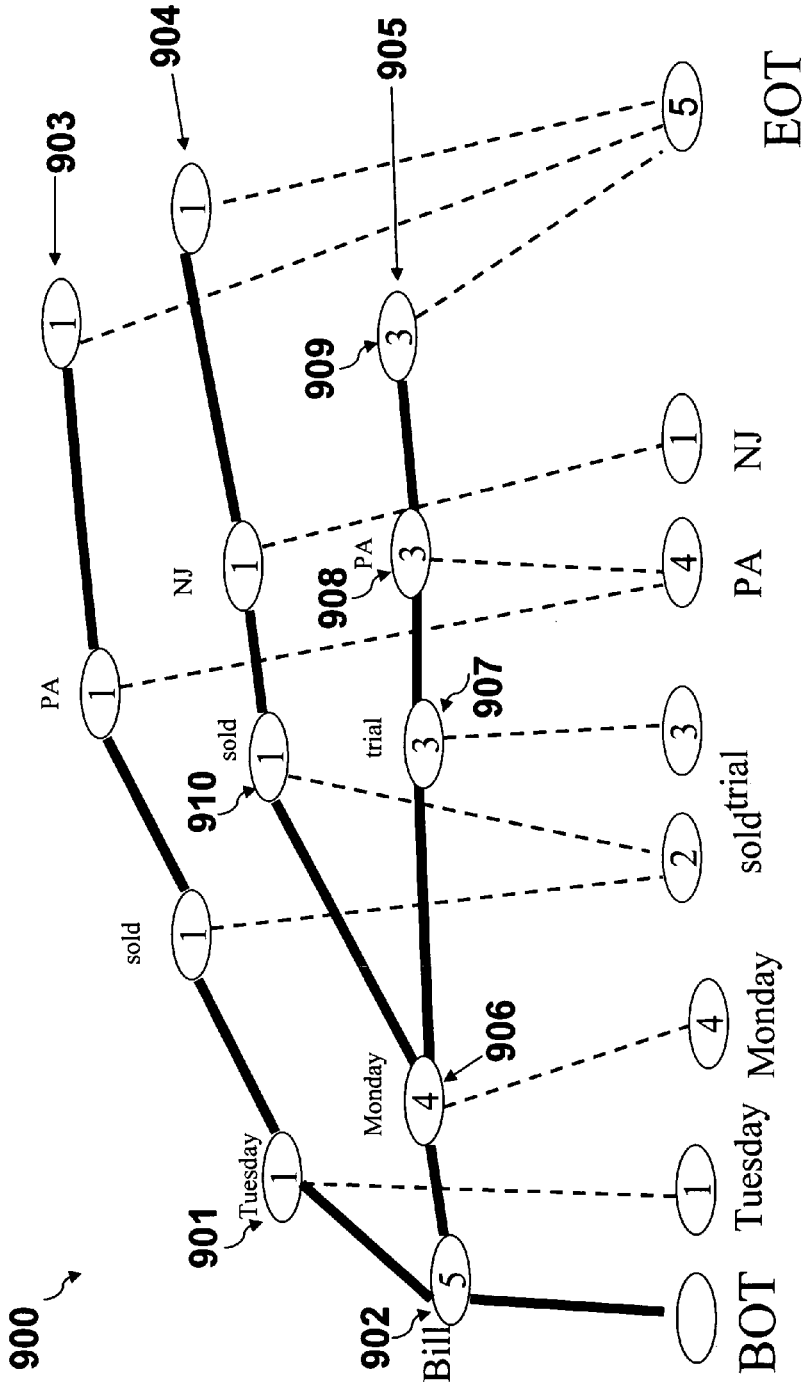
FIG. 9A is a possible KStore node diagram based on the sales records in FIG. 8.

FIG. 8 shows an exemplary set of five fictional records 800 which can be used to help illustrate the various methods of establishing or updating counts. The fictional records 800 identify sales of a period for a furniture store salesman named Bill. FIG. 9A is a node diagram 900 of a possible KStore, illustrating how the nodes might be established in a KStore in the ordinary course of processing the particlized data from FIG. 8 into the K Engine as described in the discussion on the praxis procedure 300 and in earlier patent documents referenced and incorporated herein above.

Counts are shown in FIG. 9A as the numbers within each node. Note that FIG. 9A contains all of the exemplary nodes that might possibly be established from the exemplary sales data shown in FIG. 8. While all of the nodes are shown, the count field is higher in some nodes than in others since the event that the node represents has been experienced more often than others. For example, in FIG. 9A the node 901 is associated with the sequence Bill-Tuesday and is shown with a count of 1. Referring back to the fictional records in FIG. 8, notice that only one record contains the particle sequence Bill-Tuesday. For this reason, the count field 702 for the node 901 is set to 1 in FIG. 9A. The node 902, which represents Bill, has a count of 5 since all five of the fictional records in FIG. 8 start the particle sequence with the particle Bill.

As shown in FIG. 9A, the K paths 903, 904 and 905 are established following the praxis procedure 300 as explained above. For example, using the exemplary fictional data of the record set 800, the K structure 900 in FIG. 9A can be established as follows. The first fictional record experienced may have been Bill_Tuesday_Sold_PA. As the praxis procedure 300 is followed, assume that in FIG. 9A, the K path 903 includes five nodes that are established for this record. The first field particle sequence in the record is Bill. Therefore, the node 902 can be the first node established in the K path 903 (after the BOT node). The node 902 can be initialized to 1 since the intensity variable is set to 1 and this is the first time the field particle sequence Bill is experienced. The root node for the particle sequence Bill (not shown) can be incremented by 1 as well. Following the praxis procedure 300, the rest of the nodes of the K path 903 can be experienced and built in the K structure. Each of the counts of the K nodes being built for the first record of the record set 800 can be incremented to 1. The corresponding root nodes can also be incremented to 1.

The second exemplary fictional record of the record set 800 experienced in the building of the K Store represented by the node diagram 900 can be Bill_Monday_Sold_NJ. Since Bill was already experienced, a new node for Bill is not created in the praxis procedure 300, as explained earlier. However, because the particle Bill is experienced a second time, the count for the subcomponent node 902 as well as the Bill root node, are incremented to 2. Since this is the first time Monday is experienced, a new node 906 is established to represent Monday. The counter is of the new node 906 set to 1. The root node for Monday is incremented to 1 also. The remaining nodes in path 904 for Sold and NJ are established in the same way in order to represent the second record. After all records 800 have been experienced, the counts reflect the number of times each of the particle sequences has been experienced. In the node diagram 900 representing the set of records 800, for example, Trial was experienced three times. Therefore, there is a count of 3 in the Trial elemental root node NJ was experienced only once. Therefore, the NJ elemental root node has a count of 1.

In a preferred embodiment of the invention, the foregoing process occurs as events are learned into a K structure. When queries are performed on a K structure that contains the transaction records, count fields 902 can remain unchanged. It should be noted however that querying may update the count fields for some alternate embodiments.

Variable Intensity Values

The increment value however is not always 1. If a situation requires it, the increment may be any value. As previously, described, the routines used by the praxis procedure 300 may update the count when they are called. The called routines can then use the increment value, or intensity value, when incrementing the count field. For example, see block 409 of FIG. 4 or the corresponding boxes in FIGS. 5B and 5C. If the transaction records being recorded are pre-sorted so that all duplicate records are grouped together, the learn routine could send the record only once with a larger intensity value to be used to increment or initialize the K node count field 702.

Referring back to FIG. 8, five fictional furniture store records 800 are shown. Notice that the last three records contain the same values: Bill_Monday_Trial_PA. In one preferred embodiment of the invention, it may be advantageous to pre-sort the five records into three records: Bill_Tuesday_Sold_PA, Bill_Monday_Sold_NJ and Bill_Monday_Trial_PA. The first two records can be learned with an intensity value of 1 as previously described. Prior to being learned into K, the intensity value for the last record Bill_Monday_Trial_PA can be set to 3. Since the Bill node 902 was already experienced twice, its counter can be incremented by the praxis procedure 300 in block 409 of FIG. 4 from 2 to 5. The node 906 can be incremented from 1 to 4 by the same intense value of 3. The counts for the newly created sub component nodes 907, 908 and 909 of the path 905 can initialize to 3 because their counts are initialized to the current intensity value of 3. Note that the elemental root nodes for Trial, PA and EOT are also incremented by the intensity variable of 3.

Furthermore, the intensity variable may change to different values and in different directions for various functions. A simple example of different intensities might be the addition of a value +1 each time a query traverses a node, and the addition of a value of −100 if a path containing a certain node (or certain sequence of nodes) is deemed (for some overarching reason not of importance to this explanation) to be a mistake. For example, a sequence can be determined to be a misspelling. Additionally, a sensor may determine that an area contains a dangerous chemical. A human child simulator may touch and burn itself on a hot stove in a simulation.

In an alternate embodiment a separate node can hold a new intensity value for each kind of node traversal, thus creating a cluster in situations where a node is accessed during queries of type one, type two, experience one, experience two, etc. ad infinitum. In an alternate preferred embodiment, intensity variables in a count field can provide a simple approach to this problem. If this alternative is considered, an approach of using a separate node, possibly even an elemental node, or root node, to record a count for the number of traversals of each type related to the node is one way to implement this approach. The praxis procedure 300 can then handle the updating of this node as shown in FIG. 5B.

Thus, in one embodiment, a count field 702 of a K node can be incremented when new data is incorporated in an interlocking trees data store, while incrementing the count field may be omitted when the interlocking trees data store is being queried. This approach yields a bigger value for new data and no change for inquiries. Accordingly, the intensity variable must be chosen for its suitability to the problem being addressed by the invention.

Negative Intensity Values

As shown above, the intensity value need not always be positive. Records or paths may be deleted from the K by subtracting an intensity value from their counts. In a field/record universe if a situation requires it, the count may be decremented to delete a record from the structure. The record to be removed can be presented as particles to the praxis procedure 300 in the same manner as a new record or a query, except that a negative intensity value can be provided.

Refer to FIG. 9B where the node diagram 1000 is shown. The node diagram 1000 differs from the node diagram 900 of FIG. 9A in that the counts for the nodes of the path 903 have been decremented by an intensity of 1. If the system has been so configured, and a record has been marked to be deleted (after already having been established into a K structure), the count field 702 for the nodes in the path 903 can be decreased by 1. This can result in the count fields of some of the nodes being zeroed as is shown in path 903 of the node diagram 1000.

In some preferred embodiments of the invention the count can be decremented to 0 but the nodes can remain in the K structure to indicate a history. In other embodiments, if the count is decremented to 0 the nodes can be entirely deleted from the K structure. The praxis procedure 300 can determines whether to delete the nodes having a count of 0 within block 409 of FIG. 4, or the corresponding blocks in FIGS. 5B and 5C. In FIG. 9B the nodes in path 903 have been decremented to 0 but the path remains in the structure to provide a history.

Using the Count for Determining a Most Probable K Location

The concept of a most probable node location refers to the possibility of using count fields 702 to determine the most probable or the least probable path from a current K location to a next K location. The ability to determine a most probable or least probable next location can be used when learning is inhibited and a current input particle does not match any Result node of an asCase node of the current input particle.

Refer back to FIG. 4. The process sensor data procedure 400, called by the praxis process 300, can determine in block 405 that a received particle sensor does not match the Result node of any asCase nodes of the K location pointer for the first level of the K structure. As explained in description of the praxis procedure 300 above, execution can proceed to block 408 where the procedure 300 calls for a new node to be created. However, if learning is inhibited, a new node cannot be created as shown in block 408. In this case the praxis procedure 300 may determine the most probable K location in one preferred embodiment of the invention. This may be accomplished within the operations of block 409.

In order to determine the most probable next node, the asCase list of the current K node can be accessed. For each of the asCase nodes on the asCase list the count field 702 can be accessed. A determination can be made which asCase node has the highest count. The current K location can thus be set to the node having the highest count. Since the asCase node with the highest count has been experienced the most times after the current node has been experienced, it therefore has the highest probability of being the next current K location. In a preferred embodiment, a message or log file may be written to indicate that an aberration from normal processing has occurred, wherein a most probable location was used instead of a known K location. This same process can apply to all levels of the K structure, as seen in FIGS. 5B and 5C.

Referring again to FIG. 9A, assume that a particle of data Lease (not shown) is experienced after the Monday node 906 is experienced. Since only Sold and Trial have thus far been experienced after Monday there is no Lease node in the asCase list of the Monday node 906. Therefore, the exact K location for the input cannot be determined. If learning has been inhibited, a new node for Lease cannot be built. Therefore, the most probable K location can be determined.

The asCase list for the Monday node 906 is found to contain two entries: the Trial node 907 and the Sold node 910. The count fields for the nodes 907, 910 are accessed. The count field for the Trial node 907 is found to contain 3 while the count field for the Sold node 910 contains 1. Therefore, the K location pointer for the level is set to the Trial node 907 and the trial node 907 is incremented since it has the highest count, and is therefore assumed to be the most probable next node.

It should be noted that the requirement for determining the most probable node may involve checking more than a single node. It may also involve, but is not limited to checking node sequences, elemental values, asCase/asResult lists, or additional node fields of information. As well, various other count field values may be checked. For example, in some instances, the lowest value may be used to indicate most probable.

Referring to FIG. 10, there is shown a flowchart representation of the determine most probable node procedure 1010. The determine most probable node procedure 1010 can be used for determining a most probable next node from a current K node in substantially the same manner as described above.

In the determine most probable node procedure 1010 the current K node is determined in block 1014. The asCase nodes of the current K node are located in block 1018. In block 1026 the counter MaxCnt is initialized and the Result nodes of the asCase nodes are compared with an input particle as follows.

The next asCase node in the asCase list is assigned to the variable Node as shown in block 1030. If the variable Node is not null as determined in decision 1036 a determination can be made in decision 1038 whether its Result node matches the input particle. If there is a match the correct node for the input particle is found and the current K pointer can be set to the matched node as shown in block 1048.

If the Result node of the variable Node does not match the input particle, as determined in decision 1038, a determination can be made in decision 1040 whether the count of the current asCase node is greater than the highest count encountered so far by the determine most probable node procedure 1010. If the count of the current asCase node is greater than MaxCnt, it can replace the current value of MaxCnt as shown in block 1044. Additionally, the variable MaxNode is assigned the value of Node. In this manner the determine most probable node procedure 1010 can find the asCase node having the highest count as it searches for a match with the input particle. Execution of the procedure 1010 can then return to block 1030 where the next asCase node is examined.

If none of the Result nodes of the asCase nodes of the current K location match the input particle, a null is eventually found in decision 1036. Accordingly, it can be assumed that the input particle in invalid. Under these circumstances the most probable next node can be used. As shown in block 1052 MaxNode, asCase the node having the count equal to MaxCnt, is determined to be the most probable node and the K location pointer is set to the most probable node as shown in block 1060.

It will be understood that small modifications of the determine most probable node procedure 1010 depicted in FIG. 10 that are well understood by those skilled in the art can be used to determine the least probable node, the two most probable or least probable nodes, a combination of the most and least probable nodes or any other logical criteria.

In a real time environment, many unique situations can occur as a K structure is created. For example, as records are recorded into a K in a field/record universe, the K may be queried by multiple applications at the same time. Therefore queries from one application may encounter partially recorded events that were started by a different application. For some processes related to the queries, it may be important to only process complete records within the K.

In other cases, some of the partially recorded events may be determined to be in error during the learn process and therefore should be ignored. For example, a field in a field/record universe may have a fixed set of values, such as YES and NO. If a value of FALSE is received in the field, it can be recognized as an error condition. It is desirable to have a method for handling such an error condition. When an error such as this occurs, the partial event may be backed out of the K structure in one preferred embodiment. In another preferred embodiment the error nodes may be left within the K structure, so that a history of errors may be maintained. In this embodiment the partial event could be maintained in the K structure indefinitely. A method for identifying and ignoring the partial events during an active query is therefore useful.

Earlier U.S. patent application Ser. No. 11/185,627, entitled "Method For Reducing the Scope of the K Node Construction Lock" taught an improvement over prior art methods for preventing queries from processing partial events. The prior art taught locking the entire structure during a learn operation until the recording of an entire event was completed. Thus, in this prior art method queries could only be performed when the K structure was in a complete state. This method however may result in inefficiencies, especially when there is a large number of events to be recorded. The improvement taught in application Ser. No. 11/185,627 is a method wherein only a single node under construction is locked out, leaving the rest of the K available for accessing during the process of building the K.

Processing Partial Events

Figure 7:
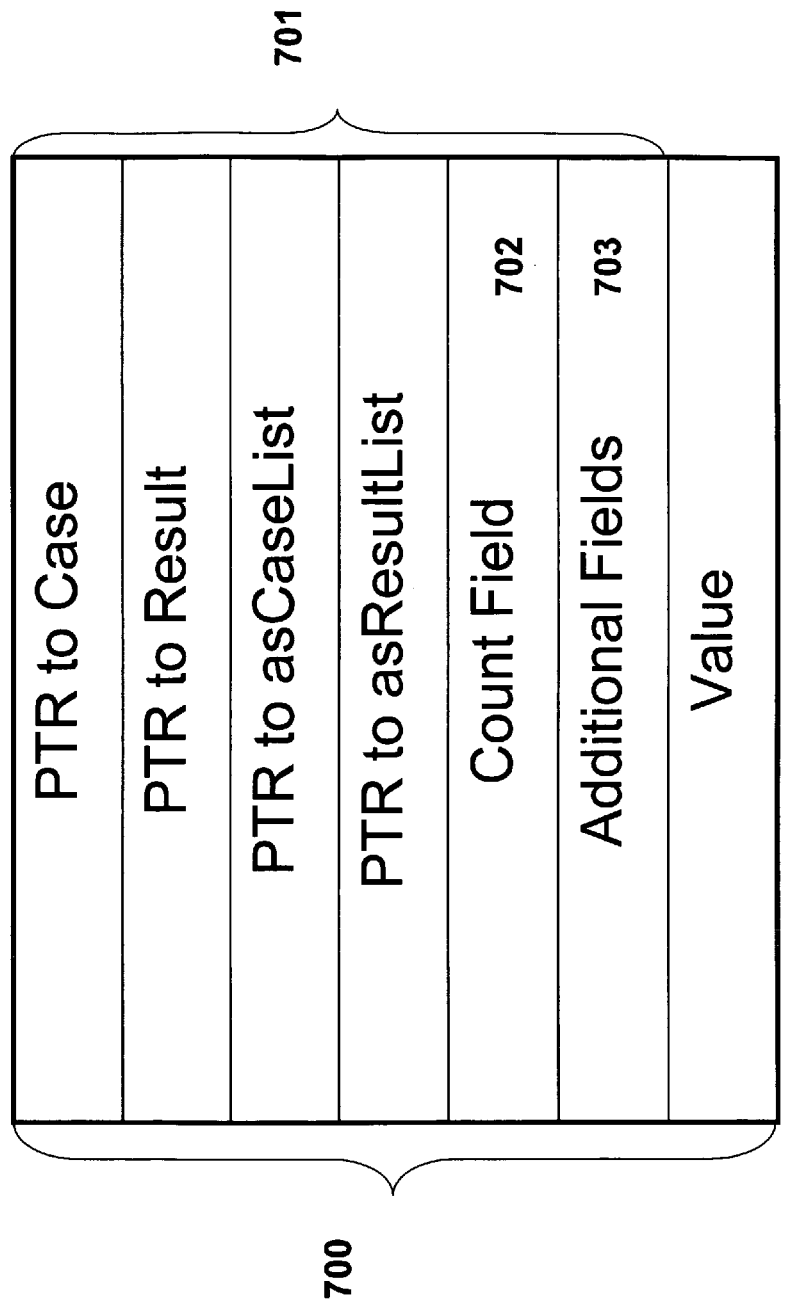
FIG. 7 is an exemplary node within K containing a count as an additional field.

As described above and in the earlier referenced patents, additional fields within the nodes 700/701 as shown in FIG. 7 may be used for different purposes, according to the needs of those skilled in the art. One purpose for an additional field is to store a count. An additional field used for this purpose is referred to as a count field, such as the count field 702 shown in FIG. 7. A count field 702 may contain a value that indicates the number of times an event has been recorded.

Processing Count after Sequence is Complete or Delimiter is Encountered

In one embodiment, a count field 702 may be updated during a learn process as nodes are either created or traversed within the Praxis procedure. For example, referring to FIG. 11A, each of the nodes in the K path 101 has a count value of 1. Thus, only one instance of each value was experienced during the learn process. Furthermore, the count field 702 for each node in the K path 101 may have been updated at the time it was created or traversed by the praxis procedure 300 (see block 409 in FIG. 4 and the corresponding blocks in 5B and 5C).

However, in another preferred embodiment of the invention the count fields 702 for the K nodes need not be incremented at the time they are traversed or created. Rather, the count fields 702 may be incremented as a set once the building or traversing of the K path 101 is complete. In this way, the count fields 702 for the existing K nodes may remain unchanged and the count fields 702 for any new structure may remain at 0 until the entire path is completed. This method permits identification of partial paths and complete paths.

The internal K utilities, learn and API utilities can thus access the count fields 702 of K nodes during any query processing and ignore any nodes 700/701 having a zero count. Thus, existing nodes can correctly indicate the number of completed paths that they were experienced by thereby maintaining the accuracy of any analytic calculations.

FIG. 11B shows a K path 102 in the process of being created. At the point shown the nodes up to the +S node are created. Since the path 102 is not completed and since the counts of the newly created nodes are not incremented until the path 102 is complete, all of the nodes in path 102 have a count of 0. The fact that the nodes along the path 102 have a count of 0 indicates that the path 102 is incomplete.

In another embodiment of the invention a method may be provided for updating an additional field 703 of a node 700/701, such as the count field 702, to indicate a complete path. The path may be traversed in any manner. A preferred traversal may include traversing the path from the end product node to the BOT node, and then traversing back across the path back to the end product node. The count field 702 associated with each node may be incremented as each node is encountered in the traversal back to the end product node. To prompt the system that a path or structure is ready to be updated, the K engine may determine when a path has been completed.

In one preferred embodiment, the K engine may initiate the traversal when it experiences a specific end product node or delimiter. As previously described with respect to the praxis procedure 300 the updating of the count fields 702 may be triggered by encountering a delimiter such as the exemplary hexadecimal delimiter 1E 282 in a field/record universe or any other delimiter that may be used to indicate an end of sequence in an input particle stream.

Referring back to FIG. 2A, assume that the paths are not yet complete and that the paths contain nodes with a count of 0 indicating that no portion of these paths has been experienced before. Further, assume that the delimiter 1E 282 is experienced and that the EOT end product node 283 is therefore created. In previous embodiments, the praxis procedure 300 could be at block 508 of FIG. 5B.

Figure 12:
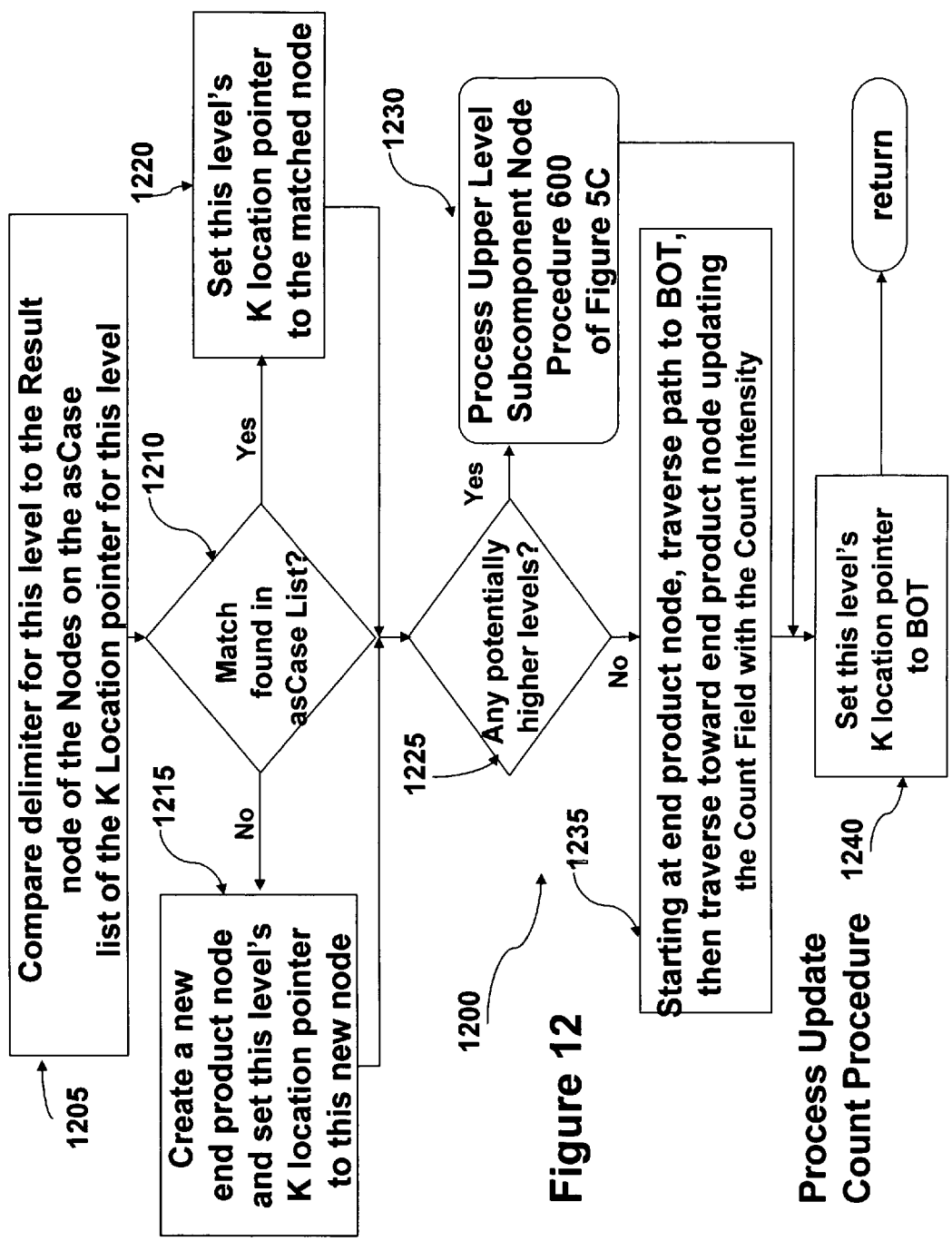
FIG. 12 is a flowchart of an alternative Process Complete Level Procedure that may update a count field after a determination that there are potentially no higher levels to process.

Refer now to FIG. 12, there is shown the process update count procedure 1200 which might replace FIG. 5B for this alternative embodiment. Note that in this alternative embodiment, box 409 of FIG. 4 and box 518 of FIG. 5C are ignored. The process update count procedure 1200 may then be used to update the count fields 702 of all nodes 700/701, for example, following a traversal of existing or newly created K structure along the entire path.

When an end of sequence delimiter is experienced the process update count procedure 1200 of FIG. 12 may be called from box 503 of FIG. 5A instead of procedure 550 FIG. 5B. In block 1205 of procedure 1200 the current node is determined and the nodes on the asCase list of the current node are located. A determination is made whether the Result nodes of any of the foregoing asCase nodes match the input delimiter, as shown in decision 1210. If no match is found a new end product node is built and the current node pointer is pointed to the new node as shown in block 1215. If a match is found, the current K pointer is set to the matched node as shown in block 1220.

In either case a determination is made whether there are potentially any higher levels as shown in decision 1225. If there were any higher levels in the KStore, execution would proceed to the process upper level subcomponent node procedure 600 of FIG. 5C as shown in block 1230. If there are no potentially higher levels execution proceeds to block 1235. In block 1235 a traversal may be performed from the end product node to the BOT node. A traversal in the opposite direction may then be made from the BOT node to the end product node, incrementing the count fields of all nodes encountered along the traversal by the intensity value. Whether or not higher levels are found in decision 1225 the K location pointer is set to the BOT node in block 1240.

Note that the method for box 1235 may be processed within the Praxis procedure or may be performed as a separate method which may be referred to as TraverseAddOne or TraverseAddIntensity. This separate method may be called from box 1235 to perform the same functionality as box 1235.

Updating Counts from Outside Praxis Procedure

In one embodiment of the invention a method for updating an additional field, such as a count field, to indicate a complete path, involves initiating the update process from the external calling procedure which is called the Praxis procedure 300. The external calling procedure may be a procedure such as a learn procedure, internal K utilities or API utilities.

After it is determined that the last particle processed resulted in an end product node in this method of the Praxis procedure, a determination is made whether there are potentially any higher levels to be processed. Box 1235 in FIG. 12 might be used to set a flag or some other indicator that the sequence was completed or that a delimiter had been processed. The external calling procedure may then be notified of the completed path. The TraverseAddOne, TraverseAddIntensity or another procedure for traversing and updating the count fields at the same time may then be called. This may for instance be able implement some performance benefits by combining updates for duplicate paths.

Identifying Partial Sequences Using the Additional Fields 703

One preferred embodiment of the present invention provides another method for permitting a completed sequence indicator to indicate a partially recorded event to permit the partially recorded event to be ignored by an active query. In this alternate embodiment of the invention the completed sequence indicator may be obtained by adding an additional field 703 to the nodes in addition to the count field 702 (such as the fields shown in the nodes 700/701 of FIG. 7). In general, the additional fields 703 can be used for any purpose desired by those skilled in the art. However, in accordance with the present invention the additional fields 703 can be used as completed sequence indicators for indicating whether the node 700/701 is part of a complete event or a partial event. For example, an additional field 703 may be a Boolean field for indicating whether a node is, or is not, complete. Additionally, the completed sequence indicator can be located in an end product node. The internal K utilities, API utilities or the Learn Engine of the K Store system may then check additional field 703 in order to determine whether the node 700/701 should be ignored.

Sensors

As taught earlier, the praxis procedure 300 may recognize sensor data, delimiters and unidentified particles. As taught in U.S. Pat. No. 6,961,733 and Application Numbers 2005/0076011 and 2005/0165749, sensor data may be represented within a K structure by a node called an elemental root node, from which all other K nodes may be constructed. While sensors and elemental root nodes within interlocking trees datastores have been discussed in the above mentioned patents, the following teaches some preferred methods of processing the sensor K nodes.

A sensor K node is a type of elemental node that contains or points to values for the smallest data component, a particle, that may be incorporated into an interlocking trees data store. As taught above, sensor data may be a particle of digitized data of any type. In the case of field/record or text data, the particles may include characters such as alphanumeric characters, special characters and some control elements.

As taught above, the KEngine or Praxis procedure may use lists to keep track of the sensor K nodes. However, it will be understood that any type of data structure known to those skilled in the art may be used to keep track of the locations of the sensor K nodes as taught herein. It should also be noted that delimiter K nodes may also be maintained as part of this list.

In a previously described embodiment, whenever data is learned into a K or sent to a K, for example as a component of a user query, only individual data particles are sent to the KEngine or Praxis procedure. For example, in a field/record universe, if a sequence such as CAT is to be sent to a K, only the individual particles are sent to the Praxis process, for instance the first particle C is sent, followed by A and then T. To find the corresponding sensor K node for the particle, the Praxis procedure may search a list of sensor K nodes to find the sensor K node associated with the particle. The value of the particle may be compared to the value associated with each sensor K node. The search of the list may end when a match is found or all sensor K nodes have been searched. Because this method potentially entails searching all of the sensor K nodes which might be used in the structure, the number of sensor K nodes to search may be prohibitively large.

As noted above, there are various particle formats (pixels, text, sounds, etc.) which may be input into K. In order to use a sensor index table, an indexing scheme must first be established for the particle formats which will be received by the Praxis procedure. In the field/record universe, for example, the indexing scheme may be determined by the association of characters to the ASCII character set. Each character in the ASCII character set is associated with a unique numeric value. This value may be used as the index into the sensor index table. If the characters were from another character set, perhaps Chinese, then the Unicode character set may be used to determine the unique numeric values. If the particles were pixels, then an indexing scheme to assign unique numeric values to the various pixel combinations that may be used would be determined. Any indexing scheme which assigns a distinct unique value to a specific particle may be used.

Potentially, some of the particles received by the Praxis procedure may either be known or unknown. Earlier, in the explanation of the praxis procedure 300, it was taught that in one preferred embodiment while processing particles, known particles could be processed while unknown particles could be ignored. However just because a particle is unknown does not mean it may not be made available for processing in a K. For example, the set of possible pixel values is extremely large. It is therefore undesirable to predefine all possible pixel sensors. Therefore, if an image is scanned and digitized some of the pixels may be unknown. In another preferred embodiment, the system may be able to recognize previously unknown particles which match the format of the particles currently being processed by adding new sensor K nodes. The following teaches both embodiments with known and unknown particles.

Known Particles—Creating and Searching the Sensor Index Table

A number of different methods for learning particles of data into a K and building K nodes corresponding to the particles were taught in earlier patents. At the instantiation of a K, predefined particles are used to create a set of sensor K nodes for use in the structure. A structure, which may be called a sensor index table, may contain pointers to these sensor K nodes. Therefore, whenever the location of a sensor K node is needed, the array, or as those skilled in the art will understand, a table, or hash table or some other structure, may be accessed to find the pointer to the required sensor K node.

In a preferred embodiment, an indexing scheme is determined based upon the value of a data particle or its corresponding sensor K node. A unique numerical value based on the representation of a data particle is determined. These unique numerical values may then be used as an index into a sensor index table. The pointer to the associated sensor K node may then be located at the entry for that index. For instance, in a field/record universe, the characters used as input may be encoded using the predefined ASCII character set. This character set associates each character with a specific numeric value. For instance, the numerical value for the capital letter C in the ASCII set is hexadecimal 43. The numerical value for a question mark is hexadecimal 3F. Using this correspondence, it is then possible to use the numerical value of the particular particle as an index into a sensor index table. The numerical value of the particle C, expressed in hexadecimal is 43. Therefore the location of the entry in the sensor index table which may contain a pointer to the sensor K node for the particle C is located at entry hexadecimal 43.

Figure 13:
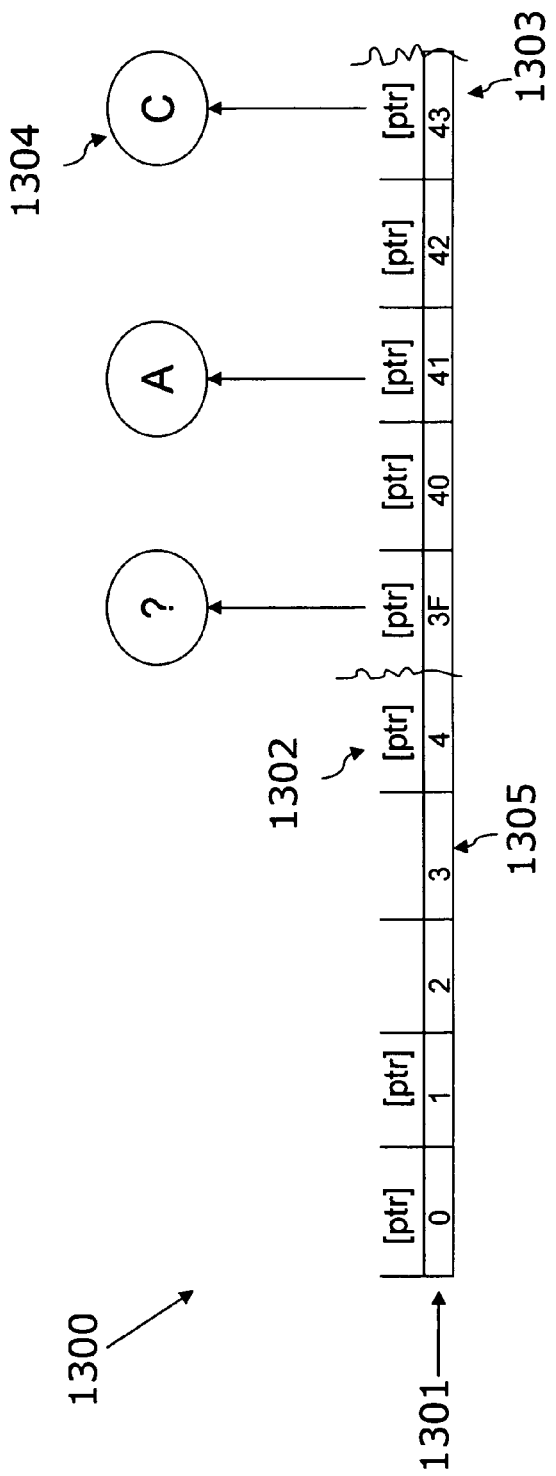
FIG. 13 shows a diagram of a portion of a sensor index table specifically illustrating eleven of the elements (0-5 and 3F-43).

FIG. 13 shows a diagram of a sensor index table 1300 with numerous entries, and specifically illustrating 11 elements (0-5 and 3F-43). In FIG. 13 nine of the illustrated elements of the sensor index table 1300 contain pointers to sensor K nodes. Some of the elements 1305 of the sensor index table 1300 are blank indicating that some elements of the sensor index table 1300, or array 1300, may not contain pointers to corresponding sensor K nodes. The index number of each element is shown in the bottom row 1301 of the table 1300 or the array 1300. Indices are used to access the elements in the array. In preferred embodiments the indices may be assigned consecutively beginning with 0. Note that the indices may start at whatever value is convenient for the indexing scheme being utilized, including negative values. For example, in FIG. 13 the indexes begin at index location 0 and continue sequentially to index location 5. The illustration of the array 1300 shown in FIG. 13 is broken after element 5 and starts again at element 3F and continues to element 43 in order to show the index 1303 for the particle C, which is the hexadecimal value 43.

Refer to FIG. 14A, which is a flowchart representation of a sensor table creation procedure 1400A. The sensor table creation procedure 1400A may be used to build a sensor index table such as the sensor index table 1300. Prior to creating the table an indexing scheme for the anticipated input particles must be determined. This scheme must assure that each particle that is to be processed has a corresponding unique numeric value. At the start of the procedure 1400A an empty table, or array, is created as shown in block 1401. The table elements are initialized to a null value, indicating that a sensor K node is not associated with that index location. Although there are a finite number of table entries for any one indexing scheme, not all of the table entries may be allocated. If for instance, we know that only alphabetic character particles will be used for input to a particular K, then we need only allocate entries for the index values corresponding to the alphabetic characters in the ASCII character set.

The next sensor particle value is received from a list of predefined sensor values as shown in block 1402. Note that the sensor values that are provided to initialize the table may be presented to the procedure in any manner convenient. In some embodiments this may be in the form of an array of particles. A determination may then be made whether a particle was received in box 1402 indicating that there is another particle to process in decision 1403.

If a particle was received as determined in decision 1403, a sensor K node may be created to represent the particle as shown in block 1404. If a determination is made in decision 1405 that the value of a particle is not within the current size of the array, the sensor table may be reallocated to a larger size as shown in block 1406. The new entries in the reallocated sensor index table are set to null as shown in block 1407. A pointer to the location of the newly created sensor K node is entered into the empty element that is indexed by the particle value.

However, if the particle value received in block 1402 is determined to be within the range of the table entries in decision 1405, the particle value may be used as an index into the array as shown in block 1408 without reallocating the sensor table to a larger size. In this case, a pointer to the newly created sensor K node is entered into the empty element of the sensor index table whose index corresponds to the particle value of block 1402.

Procedure 1400A proceeds back to box 1402 to attain the next particle to be added. The process continues until it is determined in box 1403 that there are no further particles.

During the praxis procedure 300, when a particle is received and processed a determination may be made whether the particle has a corresponding sensor K node using the sensor index table created by the sensor table creation procedure 1400A. Instead of searching through a list of sensor K nodes looking for a match between the input particle and a sensor K node, the unique numerical index of the input particle as determined by the selected indexing scheme may be used to determine whether the particle occurs in the sensor index table.

Figure 14B:
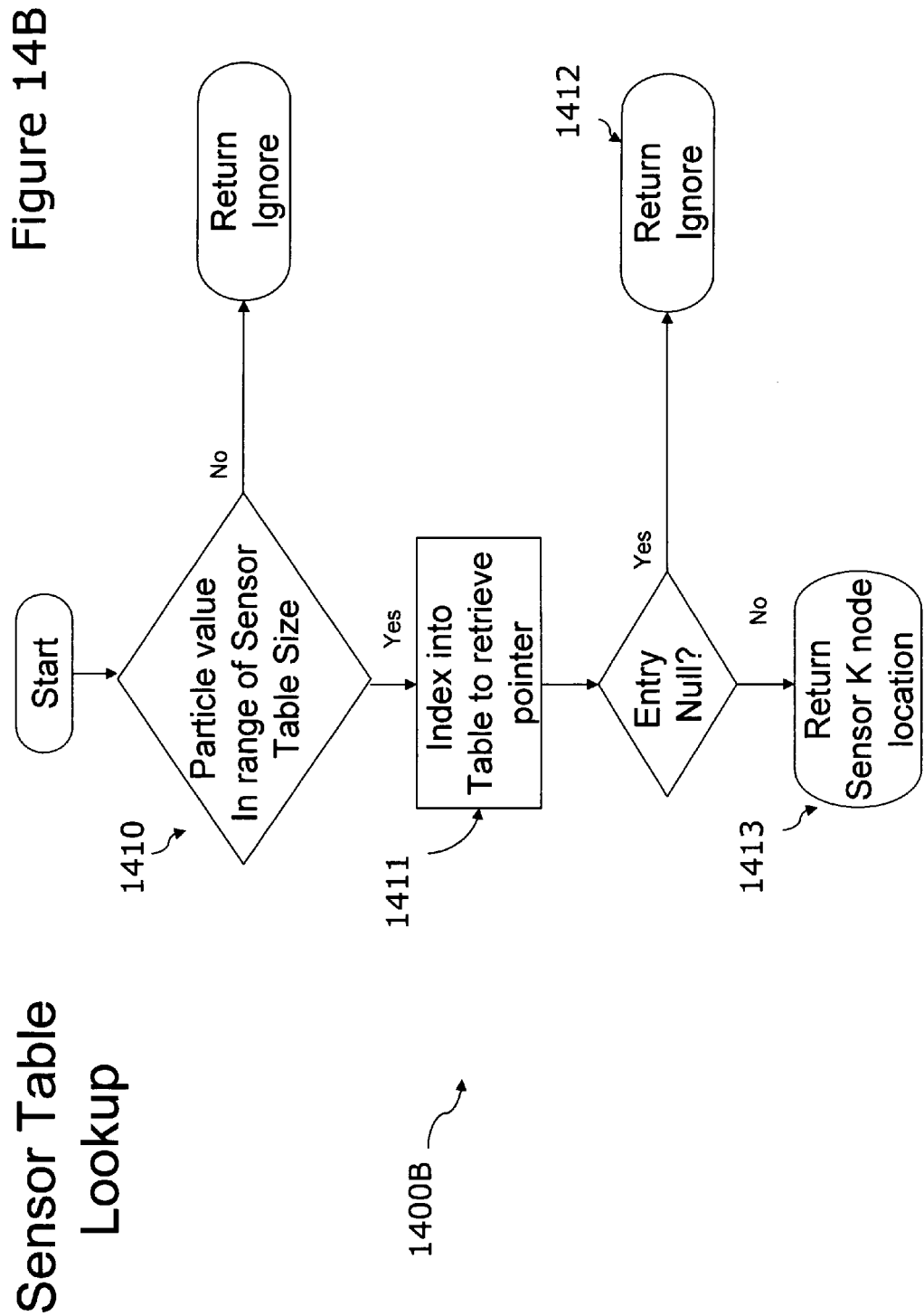
FIG. 14B is a flowchart of a process for indexing a value within a sensor index table.

Refer to FIG. 14B, which is a flowchart of the sensor table look up procedure 1400B. The sensor table look up procedure 1400B may be used for looking up values within a sensor index table formed by a procedure such as the procedure 1400A, for example, the sensor index table 1300. The process begins when a particle of data is received from the Praxis procedure box 305 FIG. 3. A determination is made whether the particle value is within the range of the sensor table size as shown in decision 1410.

If the particle value is not in range as determined in decision 1410, the particle may be ignored. This may be indicated by returning a null value to the Praxis procedure box 305, although other means may be known to those skilled in the art. If the particle is within the range of the sensor table size, the index number (e.g. the unique numeric value representing the input particle) is used as an index into the sensor index table as shown in block 1411. If the index entry contains a null table entry, the particle may be ignored as shown in block 1412 in one embodiment of the invention. If however, the index into the table points to an entry that contains a pointer, then a corresponding sensor K node exists.

The table entry located in this manner may be used to locate the specific sensor K node corresponding to the input particle and the input particle may be returned for processing as shown in block 1413 to the Praxis procedure. Examples of the manner in which the K node may be processed are taught herein above. For example, the processing of a K node may include performing a traversal of paths within the KStore making use of sensors which are the Result nodes of the K nodes in the traversed paths, as understood by those skilled in the art.

For example, referring back to FIG. 13, assume that an incoming particle of data is the hexadecimal 03. Therefore, the index for the input particle is 03. When indexing into the table 1300 it is found that index 03 indexes into the array entry 1305 since the array entry 1305 is offset three table locations from the starting location of the array. However, array entry 03 1305 of the table 1300 is empty. Since there is nothing in the table element associated with index 03, the particle may be ignored as there is no associated sensor K node.

Unknown Particles—Creating and Searching the Sensor Index Table

Refer now to FIG. 15, which is a flowchart representation of the sensor table processing procedure 1500. In another preferred embodiment of the invention, it may be permitted to add new sensor K nodes if a received particle does not have a corresponding entry in the sensor index table. The sensor table processing procedure 1500 is provided for permitting the processing of dynamic sensors.

Within the sensor table processing procedure 1500, a particle may be received from the Praxis procedure box 303. The particle value is looked up in the sensor index table as shown in block 1501. If the particle is found in the sensor index table, for example as set forth in the sensor table lookup procedure 1400B, the sensor node which corresponds to the particle is returned to the praxis procedure 300

If the particle is not found and the particle meets the criteria for adding new sensor K nodes, a new sensor K node may be created for the particle as shown in block 1505. The newly created sensor K node may contain additional fields indicating, for instance, the date the sensor was added, or any other information about the sensor that may be deemed appropriate. A pointer to the new sensor K node is entered into the table at the index location corresponding to the particle value as shown in block 1506. The location of the newly created sensor K node is then returned to the praxis procedure 300.

The invention claimed is:

1. A method for processing KStore sensors for use by a KEngine in a KStore system to process a KStore comprising:
providing a stream of particles;
instantiating a KStore sensor structure;
identifying a particle of said stream of particles to be included in a sensor set to provide an identified particle;
processing said identified particle;
receiving a particle for populating said KStore sensor structure;
determining a KStore sensor structure location in accordance with said received particle;
determining whether said selected KStore sensor structure location is within a current size of said KStore sensor structure to provide a structure size determination; and
resizing said KStore sensor structure in accordance with said structure size determination.

2. The method for processing KStore sensors for use by a KEngine in a KStore system to process a KStore of claim 1, wherein the KStore sensor structure is a list of K nodes.

3. The method for processing KStore sensors for use by a KEngine in a KStore system to process a KStore of claim 1, wherein said KStore sensor structure is an indexed array.

4. The method for processing KStore sensors for use by a KEngine in a KStore system to process a KStore of claim 3, wherein the starting index for the indexed array is zero.

5. The method for processing KStore sensors for use by a KEngine in a KStore system to process a KStore of claim 3, wherein a starting index of said indexed array is non-zero.

6. The method for processing KStore sensors for use by a KEngine in a KStore system to process a KStore of claim 5, wherein said starting index of said indexed array is negative.

7. The method for processing KStore sensors for use by a KEngine in a KStore system to process a KStore of claim 1, wherein the KStore sensor structure is a hash table.

8. The method for processing KStore sensors for use by a KEngine in a KStore system to process a KStore of claim 1, further comprising initializing a KStore sensor structure.

9. The method for processing KStore sensors for use by a KEngine in a KStore system to process a KStore of claim 8, wherein an entry is initialized to zero.

10. The method for processing KStore sensors for use by a KEngine in a KStore system to process a KStore of claim 8, wherein an entry is initialized to null.

11. The method for processing KStore sensors for use by a KEngine in a KStore system to process a KStore of claim 1, further comprising providing a predefined set of sensors to instantiate said KStore sensor structure.

12. The method for processing KStore sensors for use by a KEngine in a KStore system to process a KStore of claim 11, further comprising creating a plurality of sensor structure locations in accordance with said predetermined set of sensors.

13. The method for processing KStore sensors for use by a KEngine in a KStore system to process a KStore of claim 11, further comprising creating a plurality of sensor structure locations in accordance with a portion of said sensor set.

14. The method for processing KStore sensors for use by a KEngine in a KStore system to process a KStore of claim 1, wherein said determining comprises providing an indexing scheme.

15. The method for processing KStore sensors for use by a KEngine in a KStore system to process a KStore of claim 1, further comprising creating new KStore sensor structure in accordance with said size determination.

16. The method for processing KStore sensors for use by a KEngine in a KStore system to process a KStore of claim 1, wherein said sensor set comprises a single particle.

* * * * *